(12) United States Patent
Tse et al.

(10) Patent No.: US 6,269,286 B1
(45) Date of Patent: Jul. 31, 2001

(54) SYSTEM AND METHOD FOR INTEGRATED GASIFICATION CONTROL

(75) Inventors: Daniel W. Tse; George M. Gulko, both of Houston; Paul S. Wallace, Bellaire, all of TX (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/154,772

(22) Filed: Sep. 17, 1998

(51) Int. Cl.$^7$ .............................. G05D 21/00; C10K 3/00
(52) U.S. Cl. ...................... 700/271; 700/266; 700/268; 422/55
(58) Field of Search ..................... 700/266, 268, 700/282, 285, 301, 42, 271, 270–274; 48/86 R; 422/55, 111, 108, 110; 96/104

(56) References Cited

U.S. PATENT DOCUMENTS

| | | | |
|---|---|---|---|
| 4,400,179 | 8/1983 | Marion et al. | 48/86 P |
| 4,489,562 | 12/1984 | Snyder et al. | 60/667 |
| 4,490,156 | * 12/1984 | Marion et al. | 48/61 |
| 4,666,462 | 5/1987 | Martin | 48/197 R |
| 4,676,805 | 6/1987 | Richter et al. | 48/197 R |
| 4,789,384 | * 12/1988 | Martens et al. | 48/197 R |
| 4,888,031 | * 12/1989 | Martens | 48/197 R |
| 5,087,271 | 2/1992 | Stellaccio et al. | 48/97 R |
| 5,688,296 | 11/1997 | Andrus, Jr. et al. | 48/197 R |

FOREIGN PATENT DOCUMENTS

| | | |
|---|---|---|
| 27 57 032 | 6/1979 | (DE) . |
| WO 98/55566 | 12/1998 | (WO) . |

OTHER PUBLICATIONS

Patent Abstracts of Japan, vol. 010, No. 314 (C–380), Oct. 24, 1986; JP 61 126197 A (Hitachi Ltd.), Jun. 13, 1986, abstract.

* cited by examiner

*Primary Examiner*—William Grant
*Assistant Examiner*—Kidest Bahta
(74) *Attorney, Agent, or Firm*—Morris N. Reinisch; Howrey Simon Arnold & White

(57) ABSTRACT

An integrated control system (ICS) for a gasification plant controls the operation of a gasifier and other critical components of the gasification plant. The ICS improves the performance of a gasification plant by controlling the operation of a gasifier and other critical components by an integrated controller, rather than by several independent controllers. The ICS is a sub-system of a larger distributed control system that controls the operation of the gasification plant. The ICS controls the following: (i) oxygen to carbon (O/C) ratio in a gasifier; (ii) syngas demand or the desired output of a gasifier; (iii) load constraints; (iv) moderator flow into a gasifier; (v) air separation unit (ASU); (vi) oxygen header vent valves; and (vii) syngas header pressure.

48 Claims, 19 Drawing Sheets

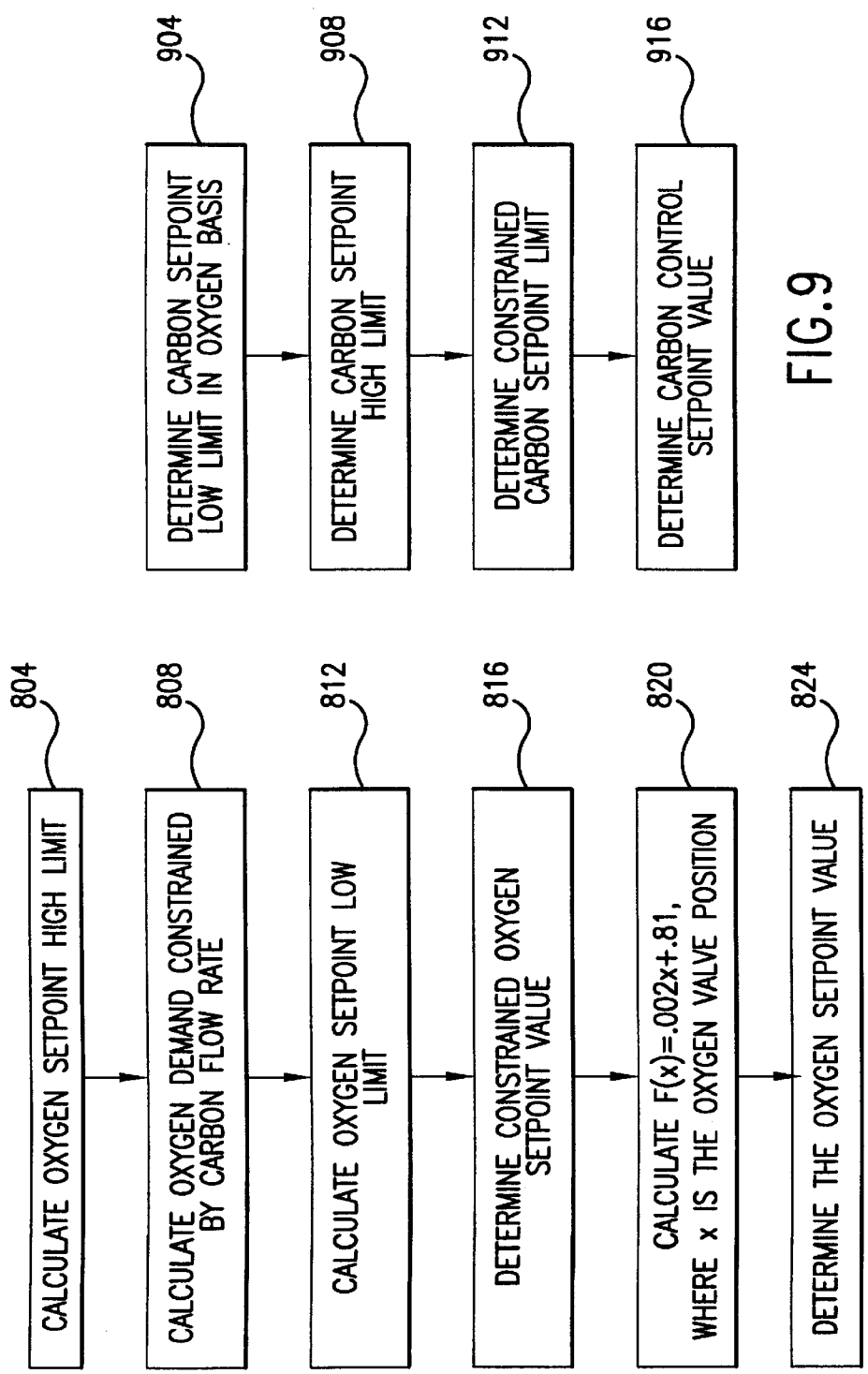

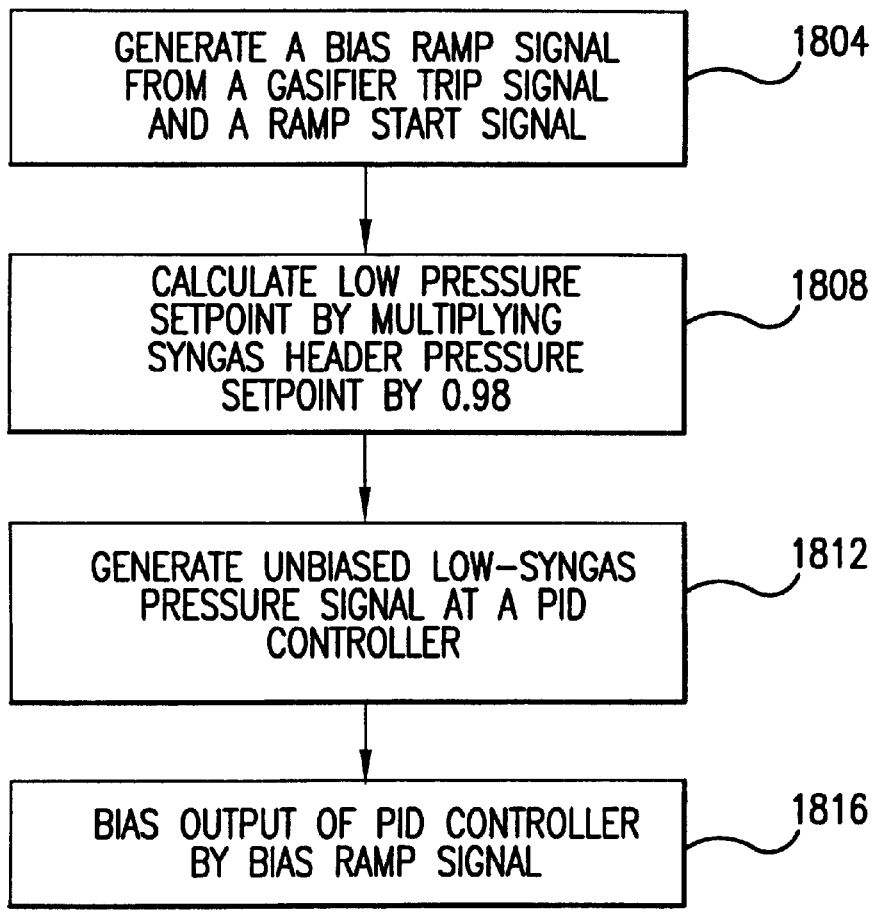

SYSTEM AND METHOD FOR INTEGRATED GASIFICATION CONTROL

BACKGROUND OF THE INVENTION

I. Field of the Invention

The present invention relates to gasification, and more particularly to a system and method for integrated gasification control.

II. Related Art

Gasification is among the cleanest and most efficient technologies for the production of power, chemicals and industrial gases from hydrocarbon feedstocks, such as coal, heavy oil, and petroleum coke. Simply stated, gasification converts hydrocarbon feedstocks into clean synthesis gas, or syngas, composed primarily of hydrogen ($H_2$) and carbon monoxide (CO). In a gasification plant, the feedstock is mixed with oxygen ($O_2$) and they are injected into a gasifier. Inside the gasifier, the feedstock and the $O_2$ are subjected to a high-temperature and a high-pressure. As a result, the feedstock and the $O_2$ break down into syngas.

In addition to $H_2$ and CO, the syngas contains other gases in small quantities, such as ammonia, methane and hydrogen sulfide ($H_2S$). As much as 99% or more of the $H_2S$ present in the syngas can be recovered and converted to elemental sulfur form and used in the fertilizer or chemical industry. Ash and any metals are removed in a slag-like state, and the syngas is cleansed of particulates. The clean syngas is then used for generating electricity and producing industrial chemicals and gases.

Gasification allows refineries to self-generate power and produce additional products. Thus, gasification offers greater efficiencies, energy savings, and a cleaner environment. For example, a gasification plant at a refinery in El Dorado, Kans. converts petroleum coke and refinery wastes into electricity and steam, making the refinery entirely self-sufficient for its energy needs and significantly reducing waste and coke handling costs. For these reasons, gasification has increasingly become popular among refiners worldwide. Currently, there are several hundred gasification plants in operation worldwide.

The operation of the gasification plant requires various control systems to control the gasifier and other equipments connected thereto. Currently, gasification plants utilize independent controllers, for example, proportional integral derivative (PID) controllers, to independently control various processes in the gasification plant. The independent controllers operate separately and do not interact with each other. As a consequence, the desired setpoint at each controller must be entered separately. Unfortunately, independent controllers often provide poor response, which results in increased wear and tear of the gasifier and other associated equipments. Specifically, poor controller response can damage a gasifier refractory vessel (a layer of bricks in the gasifier designed to keep heat inside the gasifier) and thermocouple temperature sensors that measure the temperatures in the gasifier. Poor controller response also leads to gasifier shut downs and "off-spec" syngas that does not meet required specifications.

For these reasons, a need has been recognized for an integrated control system that will control various critical components of the gasification plant. An integrated control system should improve the reliability of the gasification plant by reducing gasifier shut downs and maximizing run-time. Also, an integrated control system should reduce wear and tear of the gasifier and other associated components.

SUMMARY OF THE INVENTION

The present invention is directed toward an integrated control system (ICS) for a gasification plant. The ICS controls the operation of a gasifier and other critical components of a gasification plant. The present invention increases the performance of a gasification plant by controlling the operation of a gasifier and other critical components by an integrated controller, rather than by several independent controllers.

The ICS is a sub-system of a larger distributed control system that controls the operation of the gasification plant. Briefly stated, the ICS controls the following:

(i) oxygen to carbon (O/C) ratio in a gasifier;
(ii) syngas demand or the desired output of a gasifier;
(iii) load constraints;
(iv) moderator flow into a gasifier;
(v) air separation unit (ASU);
(vi) oxygen header vent valves; and
(vii) syngas header pressure.

The ICS provides safer operation and increased equipment life of the gasifier and other critical components by controlling the O/C ratio. Optimum hydrocarbon conversion occurs when the O/C ratio is controlled. According to the present invention, the O/C ratio is controlled by controlling the oxygen and carbon flow rates into the gasifier.

The syngas demand is determined from a demand setpoint value and a demand signal. The demand signal is produced by macro conversion of a carbon flow rate.

The load constraints are determined from a feed pump setpoint value, a feed pump PV/SP, where PV/SP is the actual power to the desired power ratio, an oxygen valve position, and an oxygen vent/recycle value.

The flow of moderators (steam) into the gasifier is controlled by adjusting one or more oxygen line steam valves and carbon line steam valves. If recycled black-water is also used as a moderator, the black-water flow is controlled by adjusting the speed of a black-water pump.

The oxygen discharge from the ASU is controlled by adjusting an oxygen compressor inlet valve. The amount of oxygen vented through oxygen header vent valves is controlled by adjusting the position of the vent valves. The syngas header pressure is controlled by three methods: a high pressure control; a low pressure control; and a "low low" pressure control.

The present invention provides a method for controlling an oxygen to carbon (O/C) ratio in a gasification plant. The method comprises the steps of: determining a syngas demand based on load constraints, the syngas demand being representative of a desired output of a gasifier; determining oxygen and carbon setpoint values based on an oxygen to carbon (O/C) ratio setpoint value and the syngas demand, and adjusting oxygen and carbon valves in the gasification plant based on the oxygen and carbon setpoint values, respectively.

The present invention provides a method for determining an oxygen setpoint value in a gasification plant. The method comprises the steps of: multiplying an oxygen setpoint value by a carbon flow rate to generate an oxygen setpoint high limit; determining an oxygen demand constrained by a carbon flow rate at a low selector from a syngas demand and the oxygen setpoint high limit; multiplying the oxygen setpoint high limit by a predetermined factor to generate an oxygen setpoint low limit, and determining a constrained oxygen setpoint value at a high selector from the oxygen setpoint low limit and the oxygen demand constrained by the carbon flow rate.

The present invention provides a method for determining a carbon setpoint value in a gasification plant. The method comprises the steps of: determining a carbon setpoint low limit at a high selector from an oxygen flow rate and a syngas demand; multiplying the oxygen flow rate by a predetermined factor to generate a carbon setpoint high limit; determining a constrained carbon setpoint value at a low selector from the carbon setpoint high limit and the carbon setpoint low limit; and dividing the constrained carbon setpoint by a O/C ratio setpoint to generate the carbon control setpoint value.

The present invention provides a method for controlling an oxygen flow in a gasification plant. The method comprises the steps of: calculating a compensated oxygen flow from an oxygen flow rate and oxygen temperature at a flow compensator; converting the compensated oxygen flow to a molar oxygen flow at a molar converter; multiplying the molar oxygen flow by an oxygen purity value to generate an oxygen flow signal; receiving the oxygen flow signal and an oxygen control setpoint value at a PID controller and generating a PID controller output signal; velocity limiting the PID controller output signal at a velocity limiter; and adjusting an oxygen valve using the velocity limited PID controller output signal.

The present invention provides a method for controlling a carbon flow in a gasification plant. The method comprises the steps of: calculating a carbon flow rate from a charge pump speed; selecting an actual carbon flow rate from an inferred carbon flow rate and a measured carbon flow rate at a signal selector; converting the carbon flow rate to a molar carbon flow rate at a molar converter; generating a carbon flow signal from the molar carbon flow rate, a velocity limited slurry concentration and a velocity limited carbon content; generating a carbon pump speed signal at PID controller using the carbon flow signal and a carbon control setpoint value; and adjusting the speed of a carbon pump by the carbon pump speed signal.

The present invention provides a method for controlling moderators in a gasification plant. The method comprises the steps of: generating a compensated oxygen line steam flow signal at a first flow compensator from an oxygen line steam flow rate, a steam temperature and a steam pressure; generating a compensated carbon line steam flow signal at a second flow compensator from a carbon line steam flow rate, the steam pressure and the steam temperature; adding the compensated oxygen line steam flow signal and the compensated carbon line steam flow signal at a first adder to generate a total steam flow signal; determining a total moderator flow from the total steam flow signal and a recycled black-water flow; dividing the total moderator flow by the carbon flow at a first divider to determine a moderator/carbon ratio; determining a desired oxygen line steam rate from the moderator/carbon ratio signal and a moderator/carbon setpoint value at a ratio controller; determining an oxygen line steam valve signal from the desired oxygen line steam rate and the oxygen line steam flow signal; adjusting an oxygen line steam valve by the oxygen line steam valve signal; determining a carbon line steam valve signal from the compensated carbon line steam flow signal and a carbon line steam flow setpoint value; and adjusting a carbon line steam valve by the carbon line steam valve signal.

The present invention provides a method for controlling an air separation unit (ASU) that provides oxygen to a gasification plant. The method comprises the steps of: comparing oxygen valve positions of a plurality of gasifiers that are operating simultaneously at a high selector, and outputting a value x; calculating $F(x)=0.002x+0.08$, where $F(x)>0.99$, and x is the output of the high selector; and calculating $F(y)=0.002y+0.81$, where $F(y)>1.0$, and y is the oxygen valve position of a selected gasifier.

The present invention provides a method for controlling high pressure of a syngas header in a gasification plant. The method comprises the steps of: receiving a syngas header flow rate, a syngas header temperature and a syngas header pressure signal at a flow compensator, and calculating a compensated syngas header flow; and calculating a syngas header flare vent valve bias from the compensated syngas header flow, the syngas header temperature, and a maximum allowable flow through a syngas header valve.

The present invention provides a program storage device readable by a machine, tangibly embodying a program of instructions executable by the machine to perform method steps of controlling an oxygen to carbon (O/C) ratio in a gasification plant, the gasification plant converting oxygen and hydrocarbon feedstock into syngas composed primarily of hydrogen ($H_2$) and carbon monoxide (CO), the method steps comprising: determining a syngas demand based on load constraints, the syngas demand being representative of a desired output of a gasifier; determining oxygen and carbon setpoint values based on an oxygen to carbon (O/C) ratio setpoint value and the syngas demand, and adjusting oxygen and carbon valves in the gasification plant based on the oxygen and carbon setpoint values, respectively.

The present invention provides a program storage device readable by a machine, tangibly embodying a program of instructions executable by the machine to perform method steps of determining an oxygen setpoint value in a gasification plant, the gasification plant converting oxygen and hydrocarbon feedstock into syngas composed primarily of hydrogen ($H_2$) and carbon monoxide (CO), the method steps comprising: multiplying an oxygen setpoint value by a carbon flow rate to generate an oxygen setpoint high limit; determining an oxygen demand constrained by a carbon flow rate at a low selector from a syngas demand and the oxygen setpoint high limit; multiplying the oxygen setpoint high limit by a predetermined factor to generate an oxygen setpoint low limit, and determining a constrained oxygen setpoint value at a high selector from the oxygen setpoint low limit and the oxygen demand constrained by the carbon flow rate.

The present invention provides a program storage device readable by a machine, tangibly embodying a program of instructions executable by the machine to perform method steps of determining a carbon setpoint value in a gasification plant, the gasification plant converting oxygen and hydrocarbon feedstock into syngas composed primarily of hydrogen ($H_2$) and carbon monoxide (CO), the method steps comprising: determining a carbon setpoint low limit at a high selector from an oxygen flow rate and a syngas demand; multiplying the oxygen flow rate by a predetermined factor to generate a carbon setpoint high limit; determining a constrained carbon setpoint value at a low selector from the carbon setpoint high limit and the carbon setpoint low limit; and dividing the constrained carbon setpoint by a O/C ratio setpoint to generate the carbon control setpoint value.

The present invention provides a program storage device readable by a machine, tangibly embodying a program of instructions executable by the machine to perform method steps of controlling an oxygen flow in a gasification plant, the gasification plant converting oxygen and hydrocarbon feedstock into syngas composed primarily of hydrogen ($H_2$) and carbon monoxide (CO), the method steps comprising:

calculating a compensated oxygen flow from an oxygen flow rate and oxygen temperature at a flow compensator; converting the compensated oxygen flow to a molar oxygen flow at a molar converter; multiplying the molar oxygen flow by an oxygen purity value to generate an oxygen flow signal; receiving the oxygen flow signal and an oxygen control setpoint value at a PID controller and generating a PID controller output signal; velocity limiting the PID controller output signal at a velocity limiter; and adjusting an oxygen valve using the velocity limited PID controller output signal.

The present invention provides a program storage device readable by a machine, tangibly embodying a program of instructions executable by the machine to perform method steps of controlling a carbon flow in a gasification plant, the gasification plant converting oxygen and hydrocarbon feedstock into syngas composed primarily of hydrogen ($H_2$) and carbon monoxide (CO), the method steps comprising: calculating a carbon flow rate from a charge pump speed; selecting an actual carbon flow rate from an inferred carbon flow rate and a measured carbon flow rate at a signal selector; converting the carbon flow rate to a molar carbon flow rate at a molar converter; generating a carbon flow signal from the molar carbon flow rate, a velocity limited slurry concentration and a velocity limited carbon content; generating a carbon pump speed signal at PID controller using the carbon flow signal and a carbon control setpoint value; and adjusting the speed of a carbon pump by the carbon pump speed signal.

The present invention provides a program storage device readable by a machine, tangibly embodying a program of instructions executable by the machine to perform method steps of controlling moderators in a gasification plant, the gasification plant converting oxygen and hydrocarbon feedstock into syngas composed primarily of hydrogen ($H_2$) and carbon monoxide (CO), the method steps comprising: generating a compensated oxygen line steam flow signal at a first flow compensator from an oxygen line steam flow rate, a steam temperature and a steam pressure; generating a compensated carbon line steam flow signal at a second flow compensator from a carbon line steam flow rate, the steam pressure and the steam temperature; adding the compensated oxygen line steam flow signal and the compensated carbon line steam flow signal at a first adder to generate a total steam flow signal; determining a total moderator flow from the total steam flow signal and a recycled black-water flow; dividing the total moderator flow by the carbon flow at a first divider to determine a moderator/carbon ratio; determining a desired oxygen line steam rate from the moderator/carbon ratio signal and a moderator/carbon setpoint value at a ratio controller; determining an oxygen line steam valve signal from the desired oxygen line steam rate and the oxygen line steam flow signal; adjusting an oxygen line steam valve by the oxygen line steam valve signal; determining a carbon line steam valve signal from the compensated carbon line steam flow signal and a carbon line steam flow setpoint value; and adjusting a carbon line steam valve by the carbon line steam valve signal.

The present invention provides a program storage device readable by a machine, tangibly embodying a program of instructions executable by the machine to perform method steps of controlling an air separation unit (ASU) that provides oxygen to a gasification plant, the gasification plant converting the oxygen and hydrocarbon feedstock into syngas composed primarily of hydrogen ($H_2$) and carbon monoxide (CO), the method steps comprising: comparing oxygen valve positions of a plurality of gasifiers that are operating simultaneously at a high selector, and outputting a value x; calculating $F(x)=0.002x+0.08$, where $F(x)>0.99$, and x is the output of the high selector; and calculating $F(y)=0.002y+0.81$, where $F(y)>1.0$, and y is the oxygen valve position of a selected gasifier.

The present invention provides a program storage device readable by a machine, tangibly embodying a program of instructions executable by the machine to perform method steps of controlling high pressure of a syngas header in a gasification plant, the syngas header transporting syngas from a gasifier, the gasification plant converting oxygen and hydrocarbon feedstock into the syngas composed primarily of hydrogen ($H_2$) and carbon monoxide (CO), the method steps comprising: receiving a syngas header flow rate, a syngas header temperature and a syngas header pressure signal at a flow compensator, and calculating a compensated syngas header flow; and calculating a syngas header flare vent valve bias from the compensated syngas header flow, the syngas header temperature, and a maximum allowable flow through a syngas header valve.

Further features and advantages of the present invention, as well as the structure and operation of the present invention, are described in detail below with reference to the accompanying drawings.

BRIEF DESCRIPTION OF THE DRAWINGS

In the drawings, like reference numbers generally indicate identical, functionally similar, and/or structurally similar elements. The drawings in which an element first appears is indicated by the leftmost digit(s) in the reference number.

The present invention will be described with reference to the accompanying drawings, wherein:

FIG. 8 is a flow diagram of a method for calculating an oxygen setpoint value;

FIG. 9 is a flow diagram of a method for determining a carbon setpoint value;

FIGS. 17A and 17B illustrate a flow diagram of a method for a high pressure control of the syngas header;

FIG. 18 is a flow diagram of a method for a low pressure control of the syngas header;

DETAILED DESCRIPTION OF THE PREFERRED EMBODIMENTS

Figure 1:
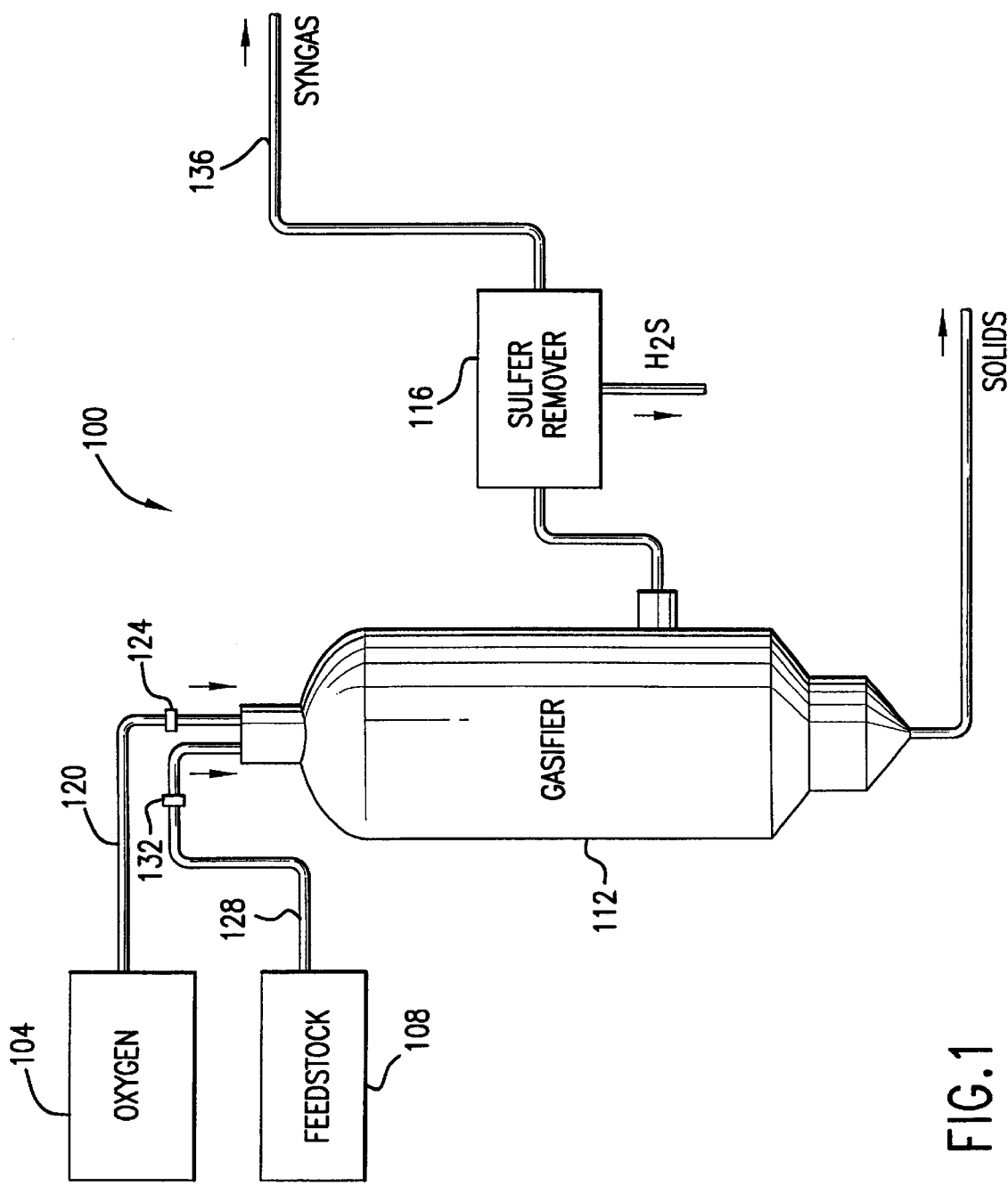
FIG. 1 illustrates a gasification system in accordance with one embodiment of the present invention.

FIG. 1 illustrates a gasification system 100 in accordance with one embodiment of the present invention. The gasification system 100 comprises an oxygen unit 104, a feedstock unit 108, a gasifier 112 and a sulfur remover 116.

The oxygen unit 104 can be an air separation unit (ASU) that receives air from the atmosphere and produces oxygen. ASUs are sold by various manufacturers, such as Praxair and Air Products. The oxygen unit 104 is typically connected to the gasifier 112 via one or more oxygen lines 120.

Alternatively, the gasification system 100 may have a plurality of gasifiers 112. In such an arrangement, the plurality of gasifiers may be connected to an ASU via an oxygen header (a main line). The oxygen is distributed among the various gasifiers via the oxygen header.

The oxygen lines 120 terminate in one or more oxygen injectors in the gasifier 112. The oxygen injectors inject the oxygen into the gasifier 112. The oxygen lines 120 also include one or more oxygen valves 124. The oxygen valves 124 are adjusted to control the flow of oxygen to the gasifier 112.

The feedstock unit 108 is connected to the gasifier 112 via one or more feed lines 128. The feedstock is supplied to the gasifier 112 via the feed lines 128. The feed lines 128 terminate in one or more feed injectors in the gasifier 112 that inject the feedstock into the gasifier 112. The feed lines 120 also include one or more feed valves 132. If gaseous feedstocks are used, the feed valves 132 are adjusted to control the flow of gaseous feedstock into the gasifier 112. In contrast, when solid or liquid feedstocks are used, their flow is controlled by the speed of a variable speed charge pump.

The gasification system 100 can be designed to process solids (for example, coal, petroleum coke, plastic, rubber), liquids (for example, heavy oil, orimulsion, refinery by-products) or gases (for example, natural gas, refinery exhaust gas). Gaseous feed stocks are directly fed into the gasifier 112, where they are mixed with the oxygen. Liquid feed stocks are generally pumped into the gasifier 112.

In contrast, solid feedstocks are generally ground into fine particles and mixed with water or waste oil to form a slurry prior to being fed into the gasifier 112. The slurry is then pumped into the gasifier 112 by a slurry pump and is fed into the gasifier 112 by the feed injectors. The slurry flow into the gasifier 112 can also be controlled by adjusting the speed of the slurry pump.

Moderators, such as, steam and recycled black-water, are added to the feed stock and the oxygen prior to gasification. The addition of moderators increases the efficiency of the gasifier 112. Steam is typically supplied via steam lines. Black-water is the water collected from the bottom of the gasifier, and is pumped back into the gasifier as a moderator.

Referring again to FIG. 1, the feedstock and the oxygen are then fed into the gasifier 112 through the feed injectors. The gasifier 112 is a refractory lined vessel that is designed to withstand high temperature and high pressure. The gasifier 112 has no moving parts or any atmospheric release points. In the gasifier 112, the feedstock and the oxygen mixture, or the "feed mix", are exposed to a temperature of approximately 2500 degrees F. and a pressure of up to approximately 1200 psi. Upon exposure to these extreme conditions, the feed mix breaks down into a gaseous mixture having two main components, $H_2$ and CO. This gaseous mixture of mainly $H_2$ and CO is known as the synthesis gas or "syngas."

The syngas may be passed through a syngas scrubber where the syngas is rinsed. The syngas contains heat that can be used to generate steam.

The gaseous mixture also includes small quantities of hydrogen sulfide ($H_2S$), ammonia, methane, and other by-products of the feed mix. The gaseous mixture is then passed through a sulphur remover 116 where $H_2S$ is removed from the gas.

The syngas is transported from the sulfur remover 116 by a syngas header 136. The syngas can be burned as a fuel to generate power. Alternatively, the syngas is used to produce fertilizers, plastics and other chemicals.

As stated before, the present invention is directed to an integrated control system for the gasification plant 100. The integrated control system controls the gasifier 112 and other associated components, such as the ASU, the oxygen header, the syngas header and the moderator.

Figure 2:
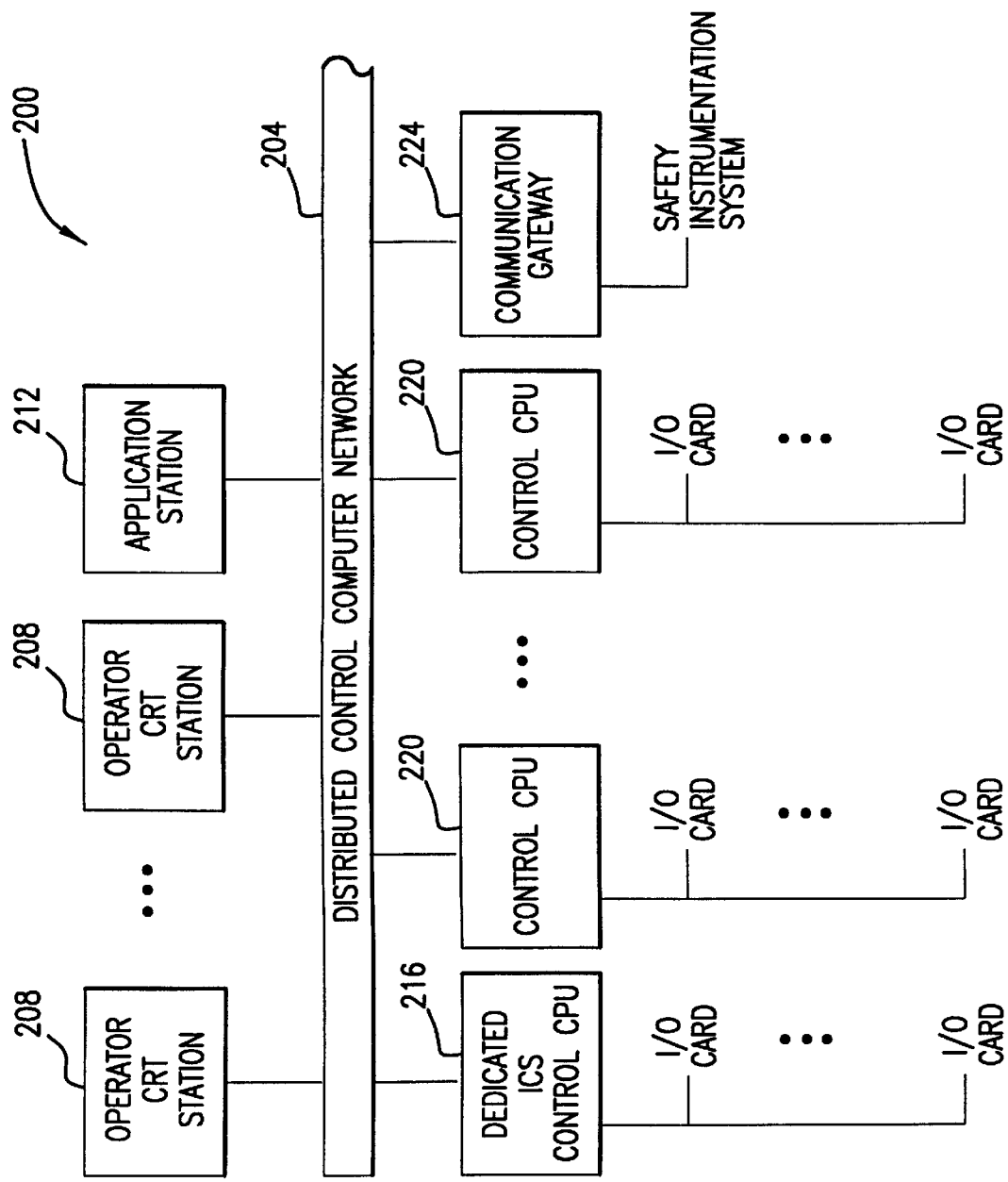
FIG. 2 is a block diagram of a distributed control system in accordance with one embodiment of the present invention.

In one embodiment, the critical control system is a part of a distributed control system that controls the operation of the gasification system 100. FIG. 2 is a block diagram of a distributed control system 200 that controls the operation of the gasification system 100.

Referring now to FIG. 2, a distributed control network 204 forms the backbone of the distributed control system 200. One or more cathode ray tube (CRT) stations 208 are connected to the network 204. The CRT stations 208 display the current state of the gasification system 100. Operators monitor the operation of the gasifier 112 and other components via the CRT stations 208.

An application station 212 is connected to the network 204. Operators generally run supervisory applications, e.g., monitoring alarms, monitoring pumps, via the application station 212.

An integrated control system (ICS) 216 is connected to the network 204. In one embodiment, the ICS 216 comprises a computer microprocessor and one or more random access memories (RAMs). The ICS 216 controls the operation of the gasifier 112 and other critical components of the gasification system 100. The RAM stores one or more programs specifically developed for the ICS 216. The computer microprocessor executes the programs stored in the RAMs. One or more input/output (I/O) cards are connected to the ICS 216. The I/O cards provide an interface between the microprocessor and various sensors, valves and pump motor speed controllers.

One or more non-critical control systems 220 are also connected to the network 204. The non-critical control systems 220 control the non-critical components of the gasification system 100. A communication gateway 224 is connected to the network 204. The gateway 224 enables the network 204 to communicate with third party systems, for example, a safety instrumentation system or an emergency shutdown system.

Figure 3:
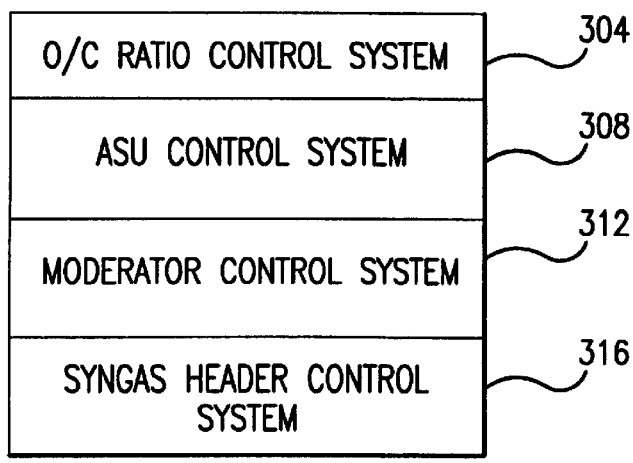
FIG. 3 is a high-level block diagram of an integrated control system (ICS) in accordance with one embodiment of the present invention.

FIG. 3 is a high-level block diagram of the ICS 216 in accordance with one embodiment of the present invention. Broadly, the ICS 216 comprises an oxygen to carbon (O/C) ratio control system 304, an ASU control system 308, a moderator control system 312, and a syngas header control system 316. Each of these systems is described in detail below.

1. O/C Ratio Control

Briefly stated, optimum hydrocarbon conversion occurs when the O/C ratio is controlled during gasification. Preferably, the O/C ratio must be continuously monitored and automatically controlled. Without continuous O/C control, the O/C ratio can become too high or too low. If the O/C ratio becomes too high, the temperature inside the gasifier 112 varies widely, which reduces the gasifier's refractory life and thermocouple life. On the other hand, if the O/C ratio becomes too low, hydrocarbon conversion drops, thereby reducing the efficiency of the gasifier 112. A low O/C ratio also increases the amount of solids produced in the gasifier 112, which causes a gasifier shutdown if the solids are not removed quickly.

The present invention provides a novel O/C ratio control that improves the performance of the gasifier 112. Also, the present invention provides safer operation and increased component life of the gasification system 100 by minimizing temperature variations in the gasifier 112. If an ASU is integrated with a gasification system 100, the O/C control system must be coupled to $O_2$ compressor controls in the ASU for steady operation of the gasifier 112 and the $O_2$ compressor.

Figure 4:
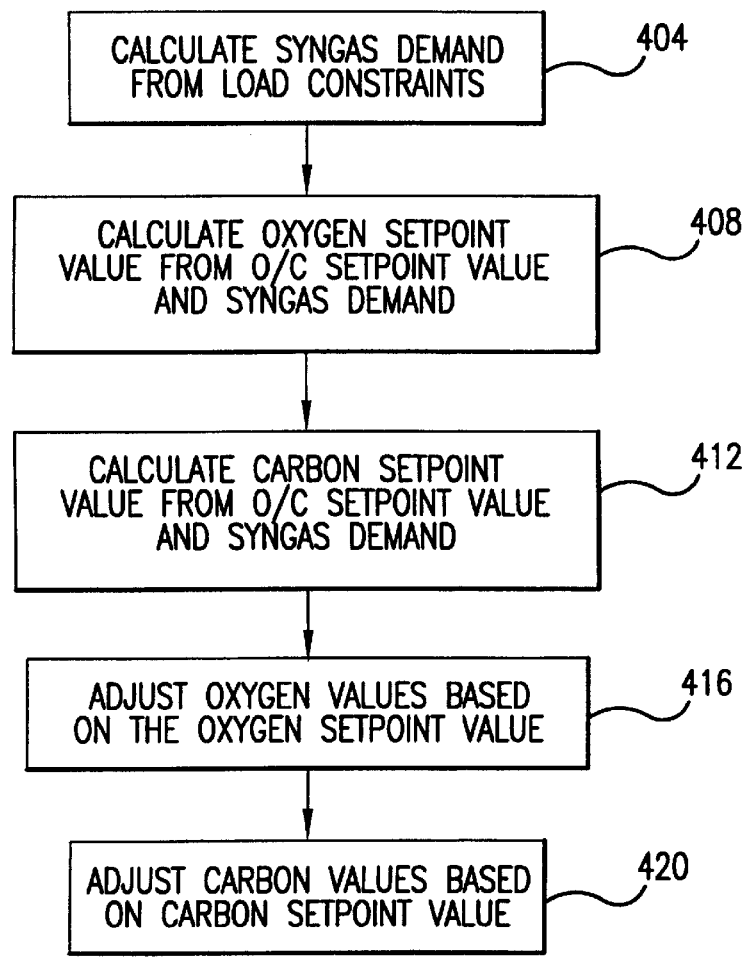
FIG. 4 is a flow diagram of a method for controlling an oxygen to carbon (O/C) ratio in accordance with one embodiment of the present invention.

Briefly stated, according to the present invention, the O/C ratio is determined by calculating the oxygen and carbon flow signal. FIG. 4 is a flow diagram of a method for controlling the O/C ratio in accordance with one embodiment of the present invention. In a step 404 a syngas demand is determined based on load constraints. The syngas demand is the desired output of the gasifier 112. The actual calculation of the syngas demand is explained in detail in FIG. 5. The load constraints are limiting factors in the feed mix that limit the performance of the gasifier 112. The load constraint calculation is also explained in greater detail in FIG. 6.

In a step 408, an oxygen setpoint value is determined based on an O/C setpoint value and the syngas demand. The O/C setpoint value calculation is described in further detail later. In a step 412, a carbon setpoint value is determined based on the O/C setpoint value and the syngas demand. In a step 416, the oxygen flow is controlled by adjusting the oxygen valves. The oxygen valves are adjusted based on the oxygen setpoint value. In a step 420, the carbon flow is adjusted based on the carbon setpoint value.

(a) Syngas Demand Control

Figure 5:
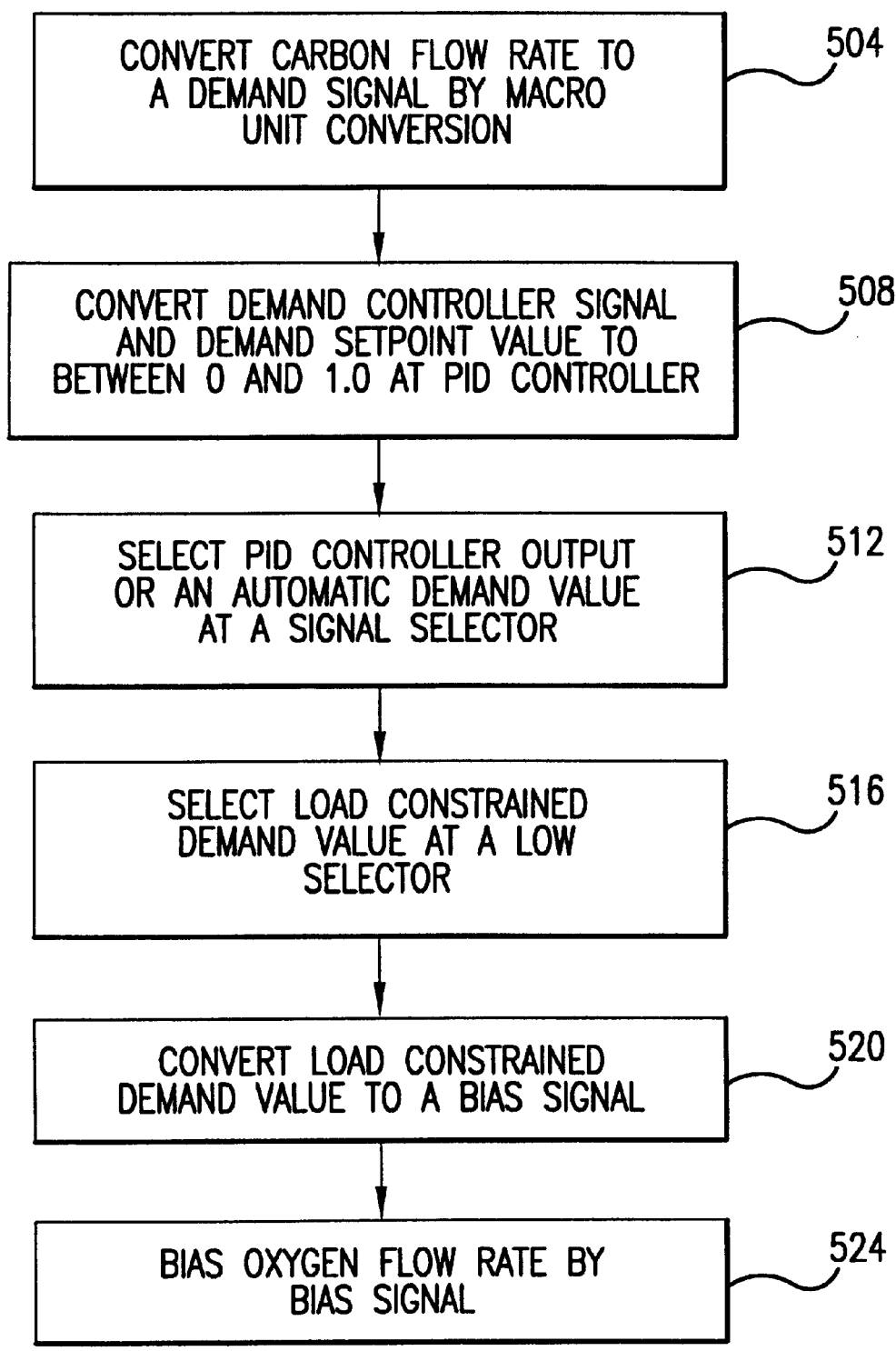
FIG. 5 is a flow diagram of a method for calculating a syngas demand in accordance with one embodiment of the present invention.

FIG. 5 illustrates the step 404 (calculating the syngas demand) in further detail. In a step 504, a carbon flow rate is converted to a demand controller signal by a macro unit conversion. Alternatively, with an integrated ASU, an oxygen flow rate is converted to a demand controller signal by a macro unit conversion to minimize ASU fluctuations. The demand controller signal is represented by a pure carbon mass flow in tons/day. The pure carbon mass flow is calculated from the following equation:

$$m=(F)*(12.011)*(24/2000),$$

where,
m=pure carbon mass flow in tons/day, and
F=elemental slurry flow in lb-mol/hour.

In one embodiment, the carbon flow rate (the elemental slurry flow) is measured by a magnetic meter or by a variable speed charge pump. In a step 508, the demand controller signal and a demand controller setpoint value are received at a proportional integral derivative (PID) controller. The demand controller setpoint value is a desired value and is generally entered by an operator.

The operation of a PID controller is well understood by persons skilled in the relevant art. The PID controller calculates an error signal that represents the difference between a signal and a setpoint value (or a reference signal), and multiplies the error signal by a gain. The output of the PID controller is a value between 0.0 and 1.0 (0% to 100%). Particularly, the PID controller calculates the error signal that represents the difference between the demand controller signal and the demand controller setpoint value, and multiplies the error signal by a gain.

In a step 512, a signal selector receives the output of the PID controller and an automatic demand value. The determination of the automatic demand value is explained in detail later. Depending on the operating mode of the gasifier 112, the signal selector selects either the output of the PID controller or the automatic demand value as the selected demand value. During a manual mode, the signal selector selects the PID controller output. During an automatic mode, the signal selector selects the automatic demand value. During an override mode, the signal selector selects the higher of the two inputs.

In a step 516, a low selector receives the selected demand value, that is, the output of the signal selector, and a syngas demand override value. The determination of the syngas demand override value is described later. The low selector selects the lower of the selected demand value and the syngas demand override value as a load constrained demand value. In a step 520, the load constrained demand value is converted to a bias signal. The bias signal has a value between −2% and +2% of a full scale, where the full scale corresponds between 0 and a maximum allowable elemental flow, where an elemental flow refers to flow in moles (1 mole=$6.02\times10^{23}$ molecules), rather than volumetric flow.

Finally, in a step 524, the oxygen flow rate is biased by the bias signal. The biased oxygen flow rate is the syngas demand signal.

(i) Load Constraints

Figure 6:
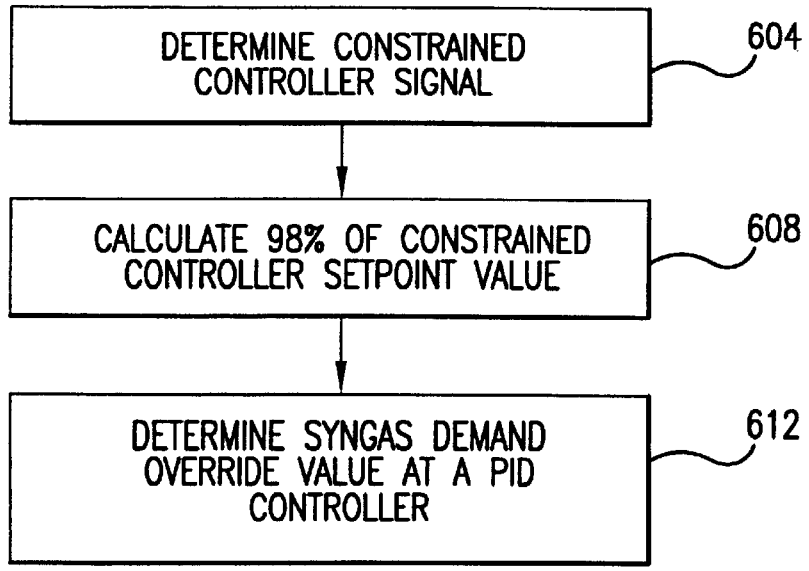
FIG. 6 is a flow diagram of a method for determining load constraints in accordance with one embodiment of the present invention.

FIG. 6 is a flow diagram of the method for determining the load constraints or the "syngas demand override value" in accordance with one embodiment of the present invention. In a step 604, a high selector selects the highest value among the following values: (1) a feed pump setpoint value; (2) a feed pump power PV/SP, where PV/SP is the actual measured power to the maximum allowable power ratio; (3) an oxygen compressor power PV/SP; (4) a gasifier oxygen valve position value (this value is used only if an integrated ASU is not used); (5) a compressor suction vent valve position value or an oxygen pump recycle valve position value (this value is used only if an integrated ASU is used); and (6) an oxygen compressor suction valve position value (this value is only used if an integrated ASU is used). The high selector outputs the highest value as a constrained controller signal.

In a step 608, a constrained controller setpoint value is multiplied by 98% (or 0.98) at a multiplier. Although, 0.98 is the preferred factor, other factors (e.g., 0.95, 0.90) may also be used.

The constrained controller setpoint value is the desired value and is entered by the operator. In a step 612, a PID controller receives the constrained controller signal from the high selector and the output from the multiplier (98% of the constrained controller setpoint value). The output of the PID controller is the syngas demand override value.

2. O/C Setpoint Control

Figure 7:
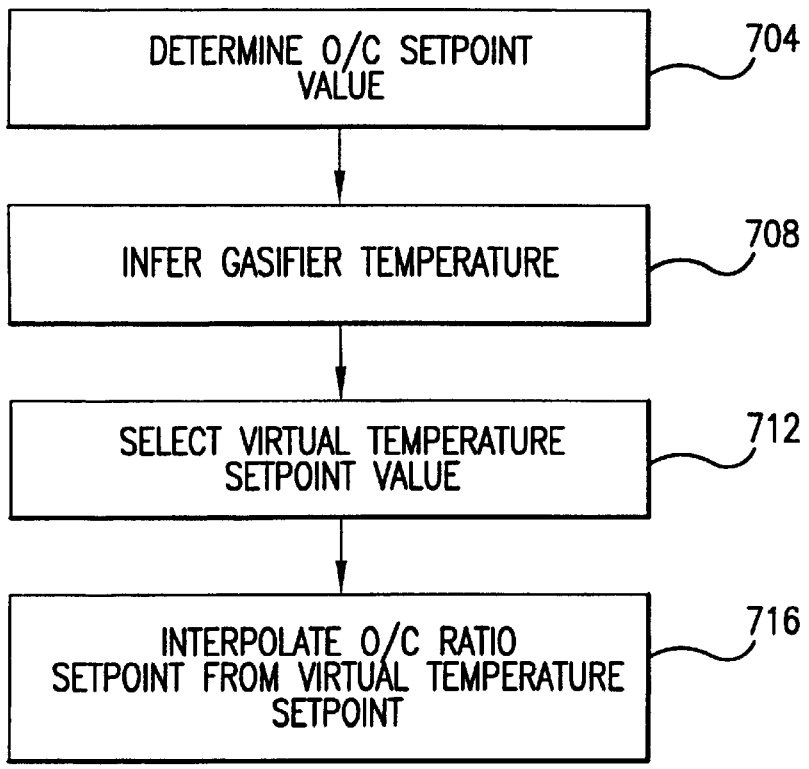
FIG. 7 is a flow diagram of a method for determining an O/C setpoint value according to one embodiment of the present invention.

FIG. 7 is a flow diagram of the method for determining the O/C setpoint value according to one embodiment of the present invention. In a step 704, the oxygen flow rate is divided by the carbon flow rate at a divider to obtain the O/C ratio value.

However, if solid or gas feedstocks are used, then the following steps must be performed in addition to the step 704 described above. In a step 708, the measured O/C setpoint value from the step 704 is used to infer the gasifier temperature. In one embodiment, a linear interpolation method is used to infer the gasifier temperature. The inferred gasifier temperature is the virtual temperature signal.

In a step 712, the operator uses the virtual temperature signal to select a virtual temperature setpoint value. In a step 716, the O/C ratio setpoint is interpolated from the virtual temperature setpoint value.

3. Oxygen Setpoint Control

FIG. 8 is a flow diagram of a method for calculating the oxygen setpoint value in accordance with one embodiment of the present invention. In a step 804, the O/C setpoint value is multiplied by the carbon flow rate at a first multiplier. The output of the first multiplier is a carbon flow rate in an oxygen basis (or an oxygen setpoint high limit). In a step 808, the syngas demand signal (biased oxygen flow rate from step 524 in FIG. 5) and the first multiplier output is received at a low selector. The low selector outputs an oxygen demand constrained by the carbon flow rate.

In a step 812, the output of the first multiplier, i.e., the oxygen setpoint high limit, is received at a second multiplier, where it is further multiplied by a factor 0.98. The output of the second multiplier is an oxygen setpoint low limit. Although, the oxygen setpoint low limit is set at 98% of the oxygen setpoint high limit, it should be understood that other factors (e.g., 95%, 90%) may also be used to set the oxygen setpoint high limit.

In a step 816, the oxygen setpoint low limit and the output of the low selector, that is, the oxygen demand constrained by the carbon flow rate, are received at a high selector. The high selector outputs a constrained oxygen setpoint value. Thus, the oxygen flow rate is constrained between 98% and 100% of the carbon flow rate. In other words, the carbon flow rate leads the oxygen flow rate but by no more than 2%. It will be apparent to one skilled in the art that the oxygen flow rate can be constrained between other percentage values of the carbon flow rate. In other words, the carbon flow rate can be allowed to lead the oxygen flow rate by other percentage values.

If an ASU is integrated with the gasification system 100, then the following additionals steps also need to be performed. In a step 820, the equation F(x)=0.002x+0.81 is solved, where F(x)>1.0 and x represents the oxygen valve position. F(x) is an oxygen setpoint modifier that is used to drive the oxygen valves fully open, that is, out of control, when the oxygen is controlled at the ASU.

The oxygen valve position calculation is described later. In a step 824, F(x) is multiplied by the output of the high selector, i.e., the constrained oxygen setpoint value, to obtain the oxygen control setpoint value.

4. Carbon Setpoint Control

According to the present invention, the carbon setpoint value is calculated from a constrained carbon setpoint and the O/C ratio setpoint. FIG. 9 is a flow diagram of a method for determining the carbon control setpoint value. In a step 904, the oxygen flow rate and the syngas demand is received at a high selector. The high selector outputs a carbon set point low limit in an oxygen basis. In a step 908, the oxygen flow rate is multiplied by 1.02 at a multiplier. The output of the multiplier is a carbon setpoint high limit. It should be understood that the oxygen flow rate can be multiplied by other numbers, e.g., 1.05, 1.1, to set the carbon setpoint high limit.

In a step 912, the carbon setpoint high limit and the carbon setpoint low limit are received at a low selector. The low selector outputs the constrained carbon setpoint. Finally, in a step 916, the constrained carbon setpoint is divided by the O/C ratio setpoint and the carbon control setpoint value is obtained.

5. Oxygen Flow Control

Figure 10:
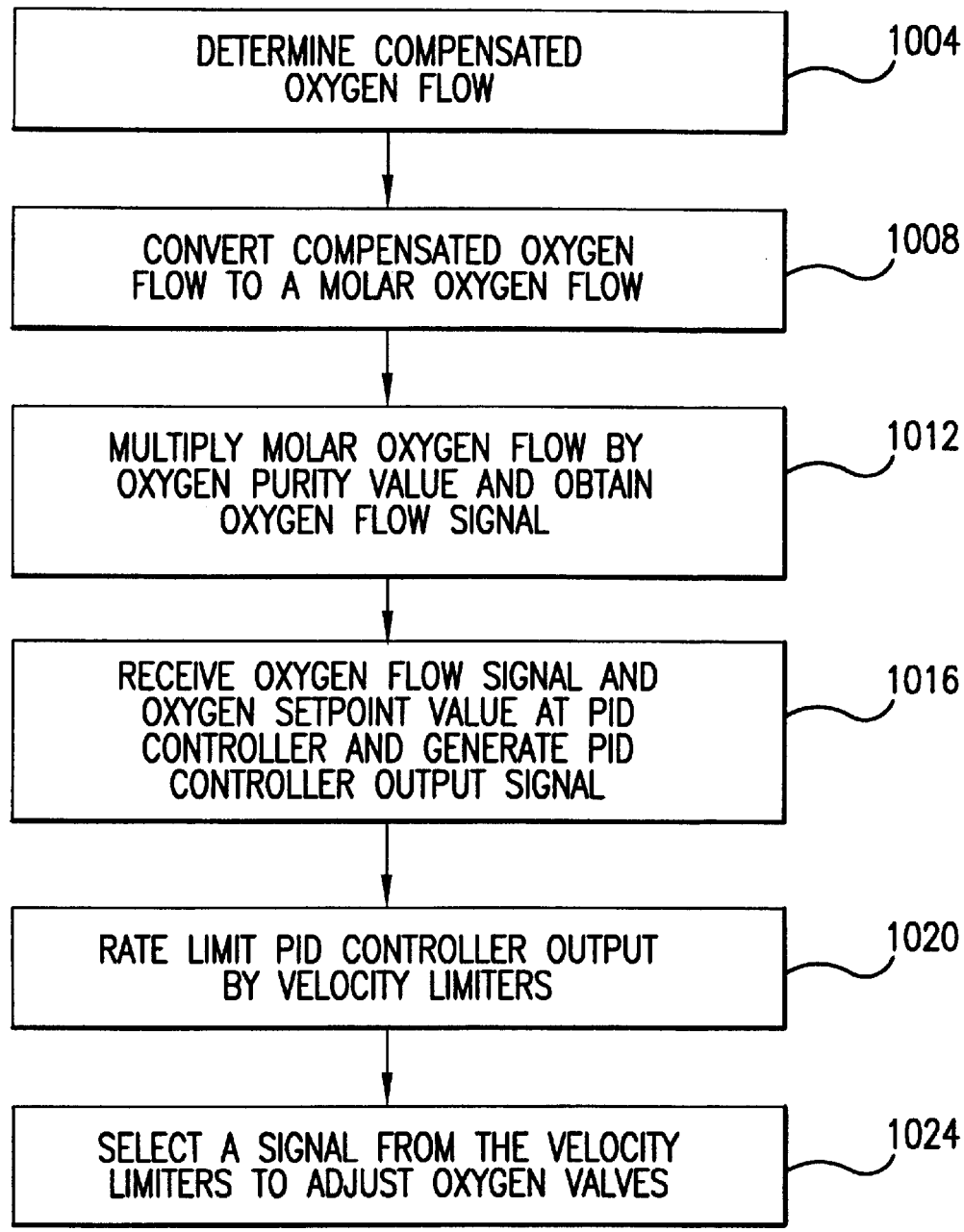
FIG. 10 is a flow diagram of a method for an oxygen flow control.

The oxygen flow rate is controlled by adjusting the valve position in the oxygen lines. FIG. 10 is a flow diagram for the oxygen flow control. In a step 1004, the oxygen temperature, the oxygen pressure and the oxygen flow rate are received at a flow compensator. The oxygen temperature is measured from thermocouples in the oxygen lines. The oxygen pressure is measured by pressure transmitters in the oxygen lines. The oxygen flow rate is measured by oxygen flow transmitters in the oxygen lines. The flow compensator corrects the oxygen flow based on pressure and temperature variations.

The compensated oxygen flow is calculated by the following equation:

$$\tilde{q} = q \cdot \sqrt{\frac{P + P_0}{P_R} \cdot \frac{T_R}{T + T_0}},$$

where, $\tilde{q}$ = compensated oxygen flow, $q$ = oxygen flow, $P$ = oxygen pressure in psig, $P_0$ = absolute pressure conversion factor, preferably 14.696 psig, $P_R$ = absolute oxygen design pressure in *psia*, $T$ = oxygen temperature in ° F., $T_0$ = absolute temperature conversion factor, preferably 459.69° F., and $T_R$ = absolute oxygen design temperature, in ° R.

The flow compensator outputs a compensated oxygen flow. In a step 1008, the compensated oxygen flow is converted to a molar oxygen flow.

The oxygen flow is converted to a molar oxygen flow by the following equation:

$$F = q^*(2/379.5)$$

where, q=volumetric oxygen flow in standard cubuc feet/hour (scsh), and

F=elemental oxygen flow in lb-mol/hour.

In a step 1012, the molar oxygen flow is multiplied by the oxygen purity value at a multiplier. The oxygen purity value (for example, 96%) is obtained from an oxygen purity analyzer. The multiplier outputs an oxygen flow signal.

In a step 1016, the oxygen flow signal and an oxygen control setpoint value is received at a PID controller. In a step 1020, the output of the PID controller is received by two velocity limiters, an increase velocity limiter and a decrease velocity limiter. The output of the PID controller is rate limited by one of the two velocity limiters, depending on the rate of change of the output. If the output of the PID controller is increasing (i.e., positive rate of change), then it is rate limited by the increase velocity limiter. On the other hand, if the output of the PID controller is decreasing (i.e., negative rate of change), then it is rate limited by the decrease velocity limiter.

In a step 1024, the output of the two velocity limiters are received at a signal selector, and the signal selector selects one of the signals based on whether the rate of change of the signal is positive or negative. If the output of the PID controller is increasing, the signal selector selects the increase velocity limiter. If the output of the PID controller is decreasing, the signal selector selects the decrease velocity limiter. The output of the signal selector is used to adjust the oxygen valve position.

6. Carbon Flow Control

According to the present invention, the carbon flow rate into the gasifier 112 is controlled by the carbon pump speed. Briefly stated, the carbon pump speed is controlled by a measured carbon flow rate and a desired carbon control setpoint. A PID controller is used to adjust the carbon pump speed.

Figure 11:
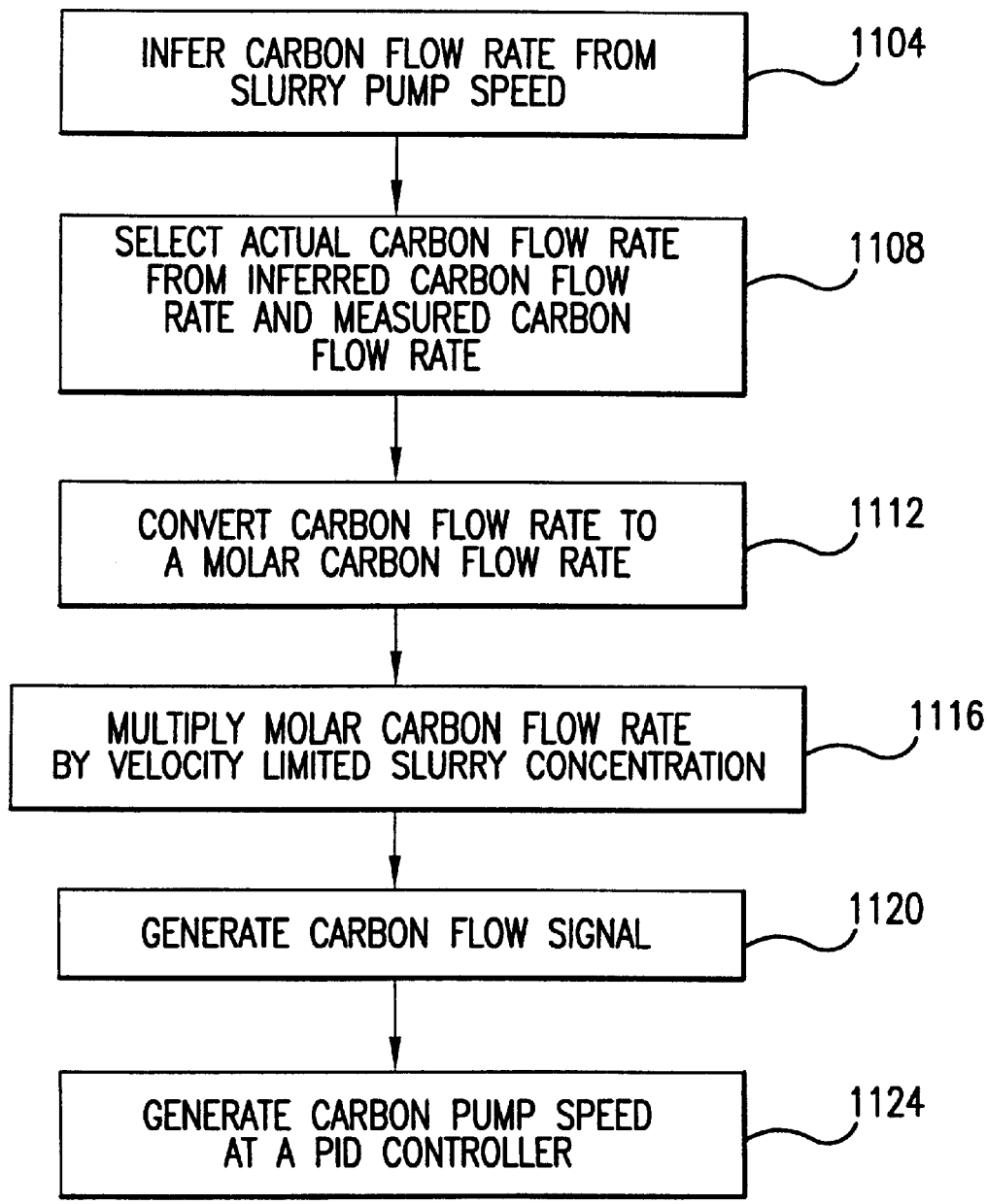
FIG. 11 is a flow diagram of a method for a carbon flow control.

FIG. 11 is a flow diagram of a method for carbon flow controls. In a step 1104, the carbon flow rate is determined from the charge pump speed. The carbon flow rate is calculated from the following equation:

$$q = q_r \cdot (s/s_r)$$

where, q=charge pump flow in gpm,
$q_r$=charge pump design flow,
s=charge pump speed in rpm, and
$s_r$=charge pump design speed in rpm.

In a step 1108, a signal selector receives the inferred carbon flow rate and the measured carbon flow rate. In one embodiment, the measured carbon flow rate is obtained from a magnetic flow meter. The signal selector selects one of the signals depending on the operating condition. The signal selector outputs the actual carbon flow rate.

In a step 1112, the carbon flow rate is converted to a molar carbon flow rate at a molar converter. For solid feedstocks, the carbon flow rate is converted to a molar carbon flow rate by the following equation:

$$F = [\{(q*8.021)\}/\{12.011*(0.017 - 0.000056*x_{slurry})\}] *(0.01 x_{slurry})*(0.1_{xcoke}),$$

where,

F=elemental carbon flow in lb-mol/hour,
q=slurry flow (represents the slurry pump speed),
$X_{coke}$=coke carbon concentration, between 85% and 92%, and
$X_{slurry}$=slurry coke concentration, between 55% and 65%.

When liquid feedstocks are used, the carbon flow rate is converted to a molar carbon flow rate by the following equation:

$$F = (q*S_g*8.021/12.011)*0.01*x_c$$

Where,

Q=carbon flow in gal/min,
F=elemental carbon flow in lb-mol/hr,
$S_g$=specific gravity of carbon, and
$X_c$=carbon content of the liquid.

The molar conversion takes into account the velocity limited carbon content and the velocity limited slurry concentration. The velocity limited carbon content and the velocity limited slurry concentration is explained below.

First, the carbon content is determined from the shipment of the feedstock, e.g., coke. The carbon content is then velocity limited or "rate limited" by a velocity limiter. For example, if the carbon content of the current shipment of the feedstock differs significantly, e.g., by 20%, from the carbon content of the previous shipment that was used in the gasifier, then the velocity limiter limits the rate of change to, for example, 0.05% per minute. In other words, the velocity limiter informs the carbon flow controls that the carbon content is changing only at a rate of, for example, 0.05% per minute rather than a drastic sudden change of 20%. The slurry concentration is determined by lab analysis and is likewise rate limited.

In a step 1116, the molar carbon flow rate is multiplied by the velocity limited slurry concentration at a first multiplier. In a step 1120, the first multiplier output is again multiplied by the velocity limited carbon content at a second multiplier. The output of the second multiplier is a carbon flow signal. In a step 1124, a PID controller receives the carbon flow signal and the carbon control setpoint value and outputs the carbon pump speed. The output of the PID controller is generally rate limited by a velocity limiter to protect the carbon pump.

7. Feed Injector Oxygen Control

As noted before, the oxygen is supplied by the ASU to the gasifier. In one embodiment of the present invention, an oxygen line is split into two lines prior to being fed into the gasifier 112. The two oxygen lines and a carbon line (from the feedstock unit) merge to form three concentric pipes in a feed injector. The center pipe supplies oxygen. The intermediate pipe surrounding the center pipe supplies feedstock. The outer pipe surrounding the intermediate pipe supplies oxygen. The oxygen is controlled by two valves. A center oxygen valve located prior to the split, that is, up-stream, and an annular oxygen valve located in the concentric section, that is, down-stream, of the pipe.

Figure 12:
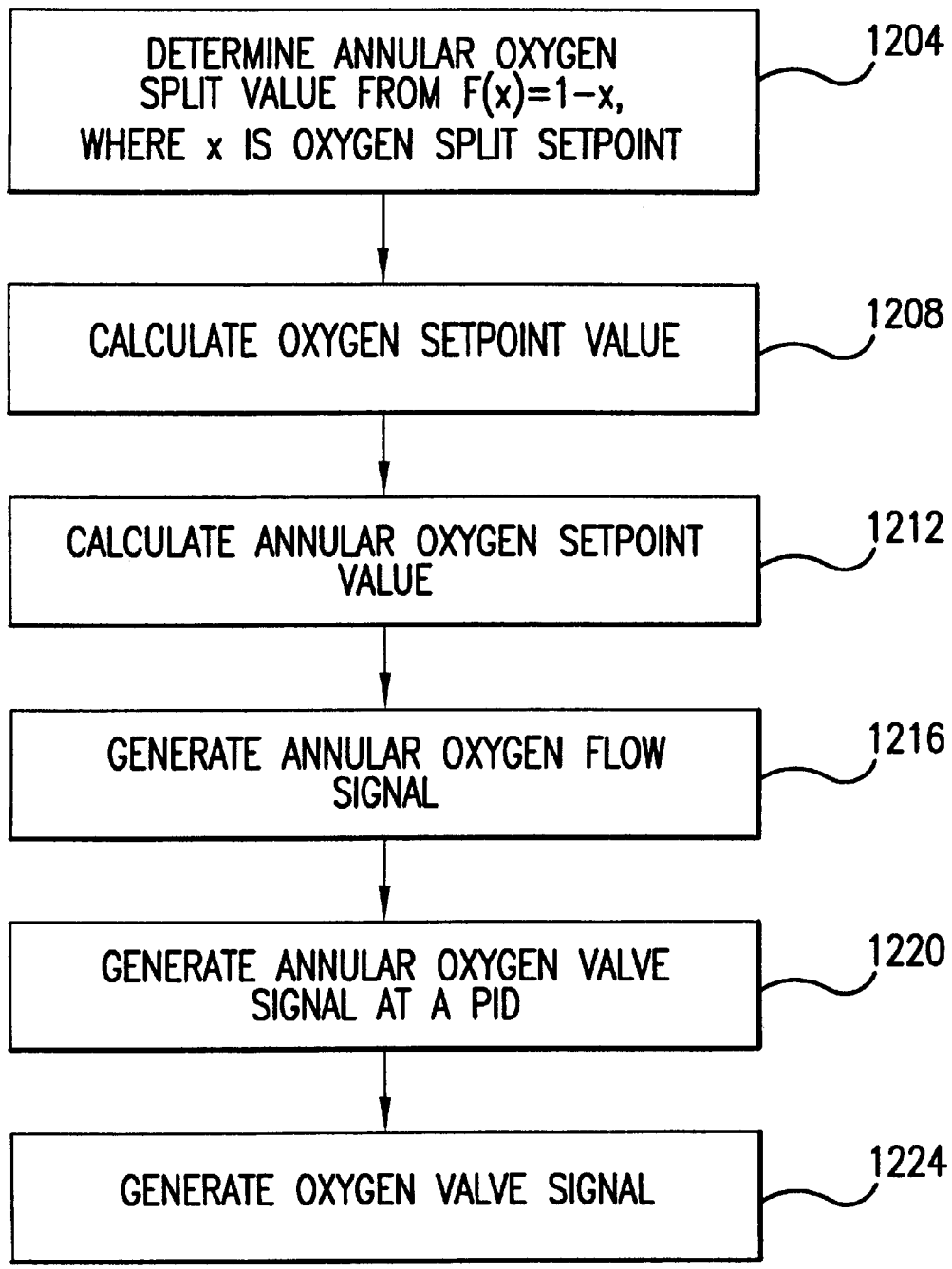
FIG. 12 is a flow diagram of a method for a feed injector control.

FIG. 12 is flow diagram for feed injector controls. In a step 1204, an annular oxygen split value is determined. The annular oxygen split value is given by F(x)=1−x, where x is the oxygen split setpoint value. The oxygen split setpoint value is the percentage (e.g., 30%) of the total oxygen that is flowing in the center line. If x=30%, then F(x)=1−0.3=0.7.

In a step 1208, the oxygen split setpoint value is multiplied by the compensated oxygen flow signal at a first multiplier. The first multiplier outputs the oxygen setpoint value. In a step 1212, the annular oxygen split signal is multiplied by the compensated oxygen flow signal at a second multiplier and an annular oxygen setpoint value is obtained. In a step 1216, the oxygen split signal is subtracted from the oxygen flow signal to obtain the annular oxygen flow signal. The oxygen flow signal is measured by transmitters in the oxygen line. In a step 1220, the annular oxygen flow signal and the annular oxygen setpoint is received at a PID controller. The PID controller outputs an annular oxygen valve position. In a step 1224, the oxygen flow signal and the oxygen setpoint value is received at a PID controller that outputs a center oxygen valve position.

8. Moderator Controls

As stated before, in a gasification process, moderators are added to the oxygen and the feedstocks before they are fed into the gasifier 112. In the present invention, steam is added to the oxygen and the feedstock. Optionally, recycled black-water may be added to the feedstock. Black-water is the water collected from the bottom of the gasifier which is then added to the carbon as a moderator. Typically, black-water collected from the gasifier is pumped back as a moderator by a pump.

The amount of moderators in the oxygen and carbon is controlled by adjusting the oxygen line steam valve and the carbon line steam valve. If recycled black-water is also used as a moderator, the amount of black-water is controlled by adjusting the speed of a recycled black-water pump.

Figure 13A:
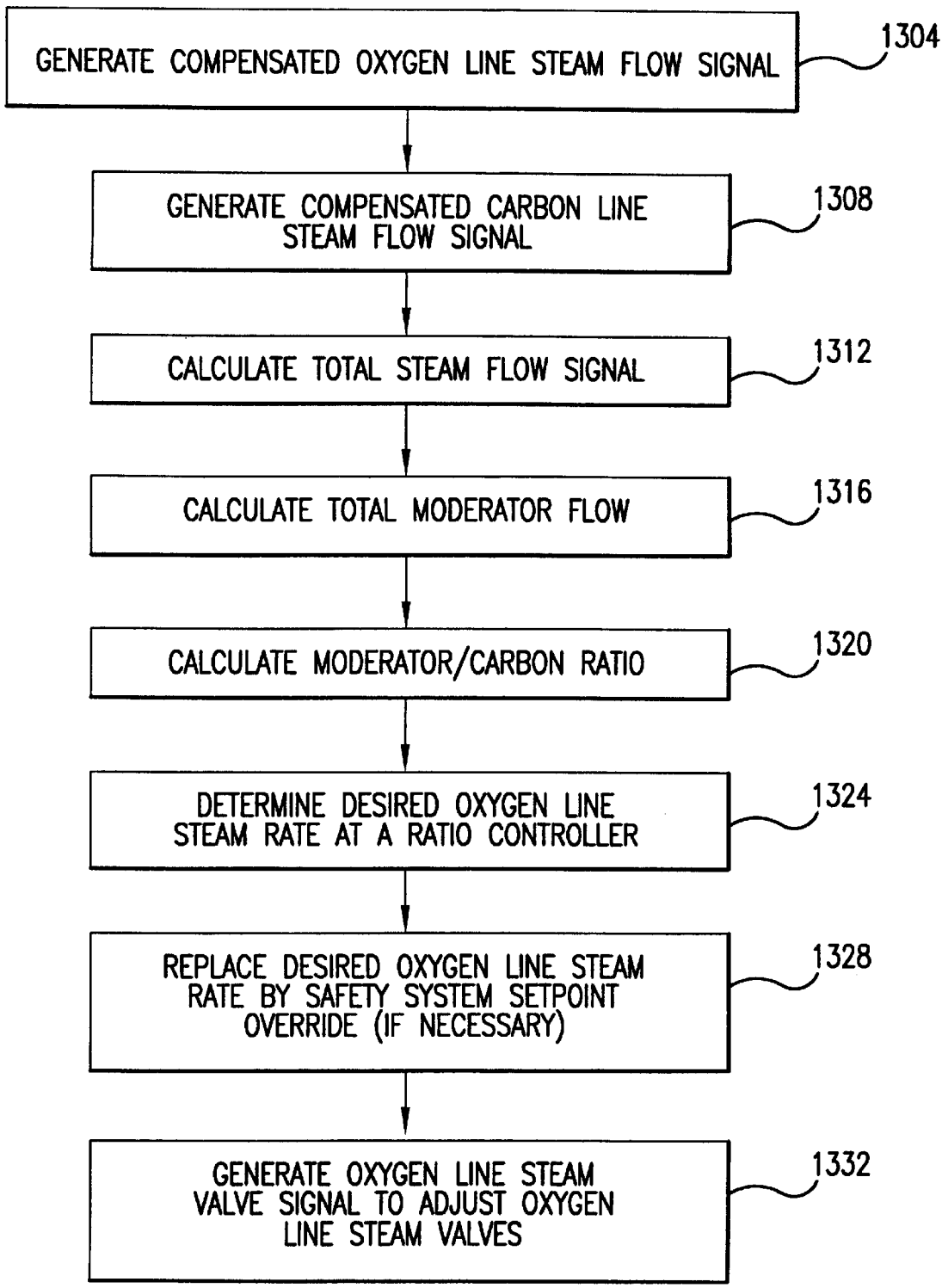
FIGS. 13A and 13B illustrate a flow diagram for controlling a moderator in the gasification system.
Figure 13B:
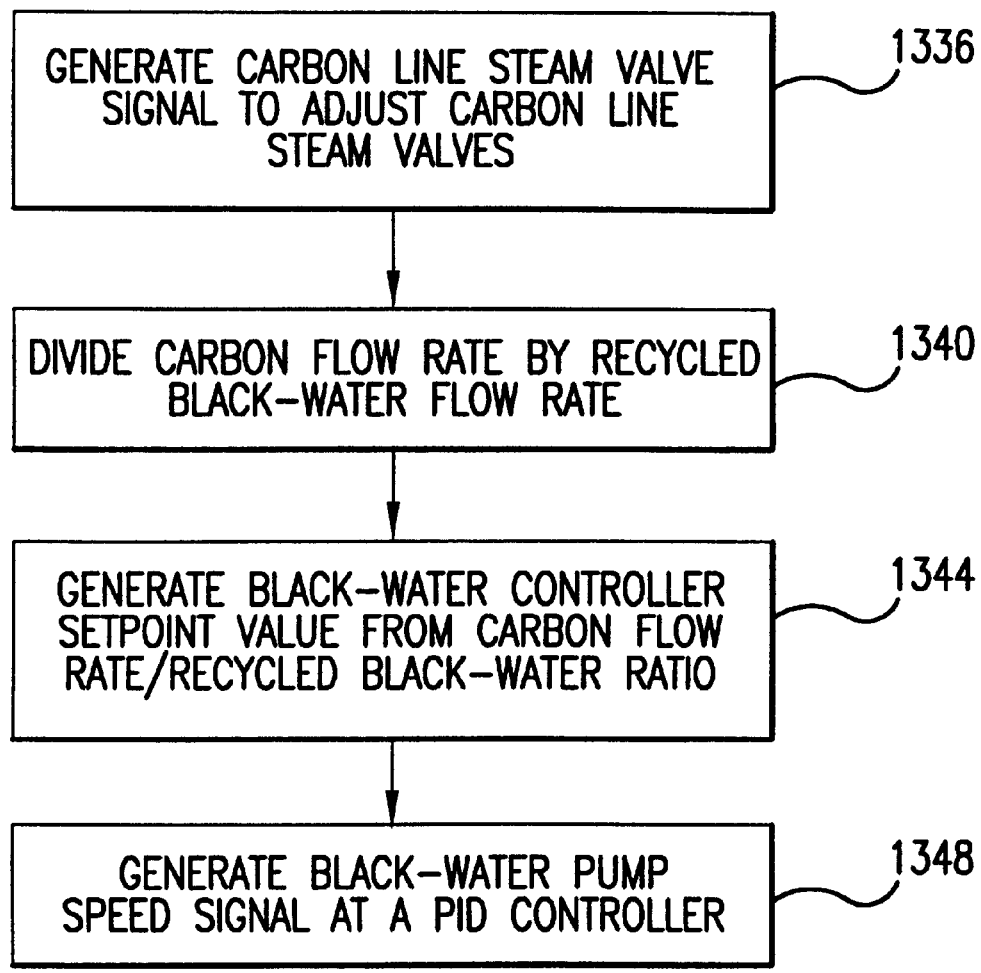

FIGS. 13A and 13B illustrate a flow diagram for controlling the moderator in the gasifier 112. In a step 1304, the oxygen line steam flow rate, the steam temperature and the steam pressure are received at a first flow compensator. The oxygen line steam flow rate is measured by a flow meter in the steam line. The steam temperature is measured by one or more thermocouples in the steam line. The steam pressure is measured by one or more pressure transmitters in the steam line.

The flow compensator outputs an oxygen line steam flow signal that is compensated for the steam pressure and the steam temperature. The compensated steam flow signal is calculated by the following equation:

$$\tilde{q} = q \cdot \sqrt{\frac{P+P_0}{P_R} \cdot \frac{T_R}{T+T_0}},$$

where, $\tilde{q}$ = compensated steam flow, $q$ = steam flow, $P$ = steam pressure in psig, $P_0$ = absolute pressure conversion, usually 14.696 psig, $P_R$ = absolute steam design pressure in psia, $T$ = steam temperature in ° F., $T_0$ = absolute temperature conversion, usually 459.69 ° F., and $T_R$ = absolute steam design temperature, in ° R.

In a step 1308, the carbon line steam flow rate, the steam pressure and the steam temperature are received at second flow compensator, and the flow compensator outputs a compensated carbon line steam flow signal. In a step 1312, the compensated oxygen line steam flow signal and the compensated carbon line steam flow signal are added at a first adder and a total steam flow signal is generated. In a step 1316, the total steam flow is added to the recycled black-water flow rate and the total moderator flow rate is determined. In one embodiment, the black-water flow rate is measured by a magnetic meter in the carbon line.

In a step 1320, the total moderator flow rate is divided by the carbon flow rate at a first divider, and a moderator/carbon ratio is generated. In a step 1324, the moderator/carbon ratio, the carbon flow rate and a moderator/carbon ratio setpoint value is received at a first ratio controller. The ratio controller outputs a desired oxygen line steam rate by comparing the moderator/carbon ratio signal and the moderator/carbon ratio setpoint value. A ratio controller typically follows a desired ratio by varying one component of a ratio while the other component of the ratio remains fixed until the desired ratio is achieved. The following example illustrates the operation of a ratio controller.

Suppose a desired ratio is 2/3 or 0.666. Now consider that a ratio controller receives a ratio x/y. The ratio controller will vary y while x remains fixed until x/y=0.666. Alternatively, the ratio controller can vary x while y remains fixed.

In a step 1328, the desired oxygen line steam rate may be replaced by a predetermined value at a safety system setpoint override. In a step 1332, the oxygen line steam flow signal and the output from the safety system setpoint override are received at a first PID controller. The first PID controller outputs the oxygen line steam valve signal that is used to adjust the oxygen line steam valves.

In a step 1336, the compensated carbon line steam flow signal and a carbon line steam flow setpoint are received at a second PID controller. The PID controller outputs a carbon line steam valve signal that is used to adjust the carbon line steam valves.

In a step 1340, the carbon flow rate is divided by the recycled black-water flow rate at a second divider. In a step 1344, a second ratio controller generates a black-water controller setpoint value from the output of the divider. In a step 1348, a third PID controller receives the recycled black-water flow rate and the black-water controller setpoint value, i.e., the output of the second ratio controller. The third PID controller outputs a recycled black-water pump speed signal that is used to control the speed of the recycled black-water pump.

9. ASU/Oxygen Controls

The present invention provides an ASU/Oxygen Controls where an ASU is integrated with the gasification system 100. The oxygen discharge from the ASU is controlled by adjusting an oxygen compressor inlet valve.

Figure 14A:
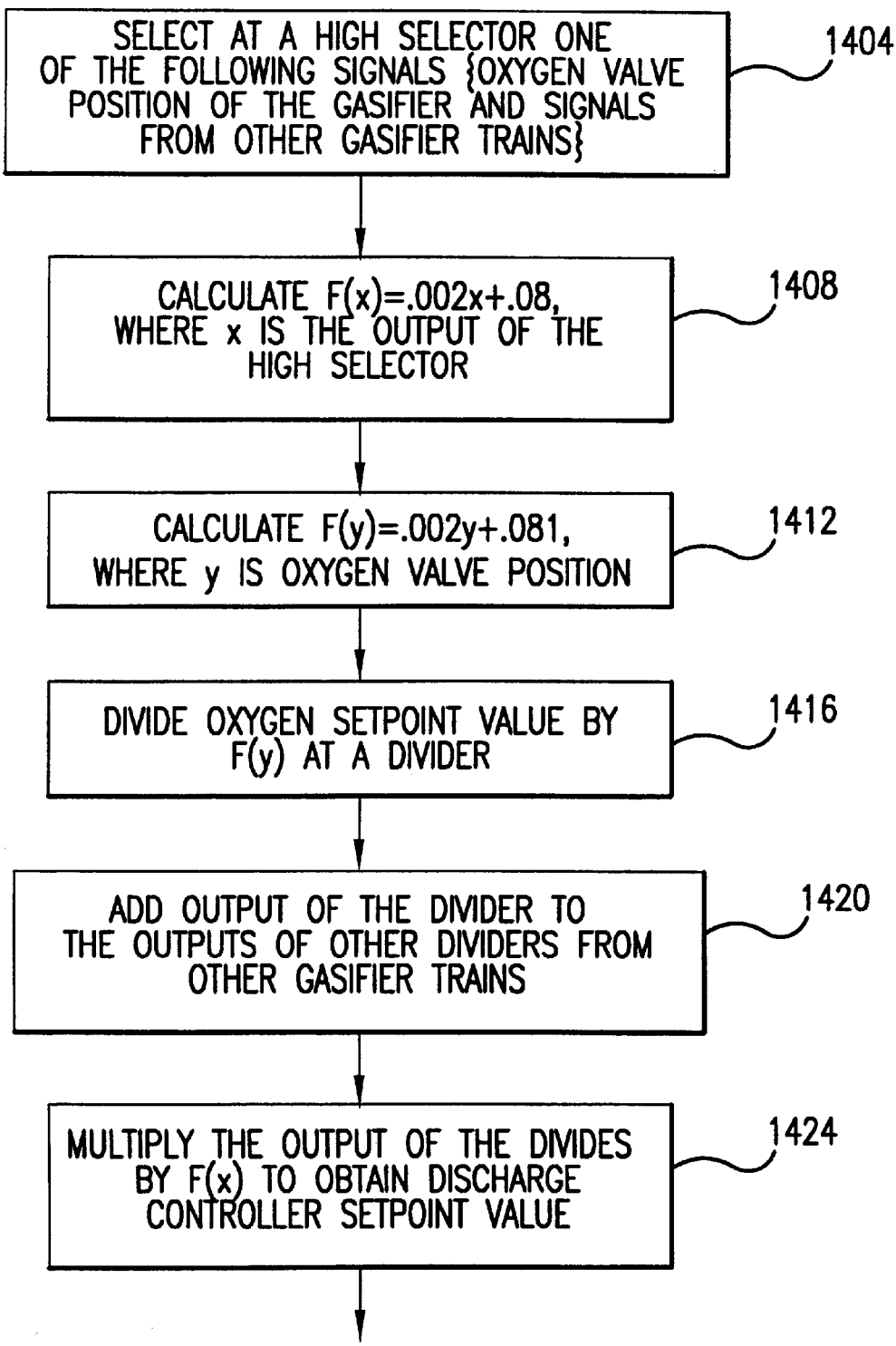
FIGS. 14A and 14B illustrate a flow diagram for an air separation unit (ASU) control in accordance with one embodiment of the present invention.
Figure 14B:
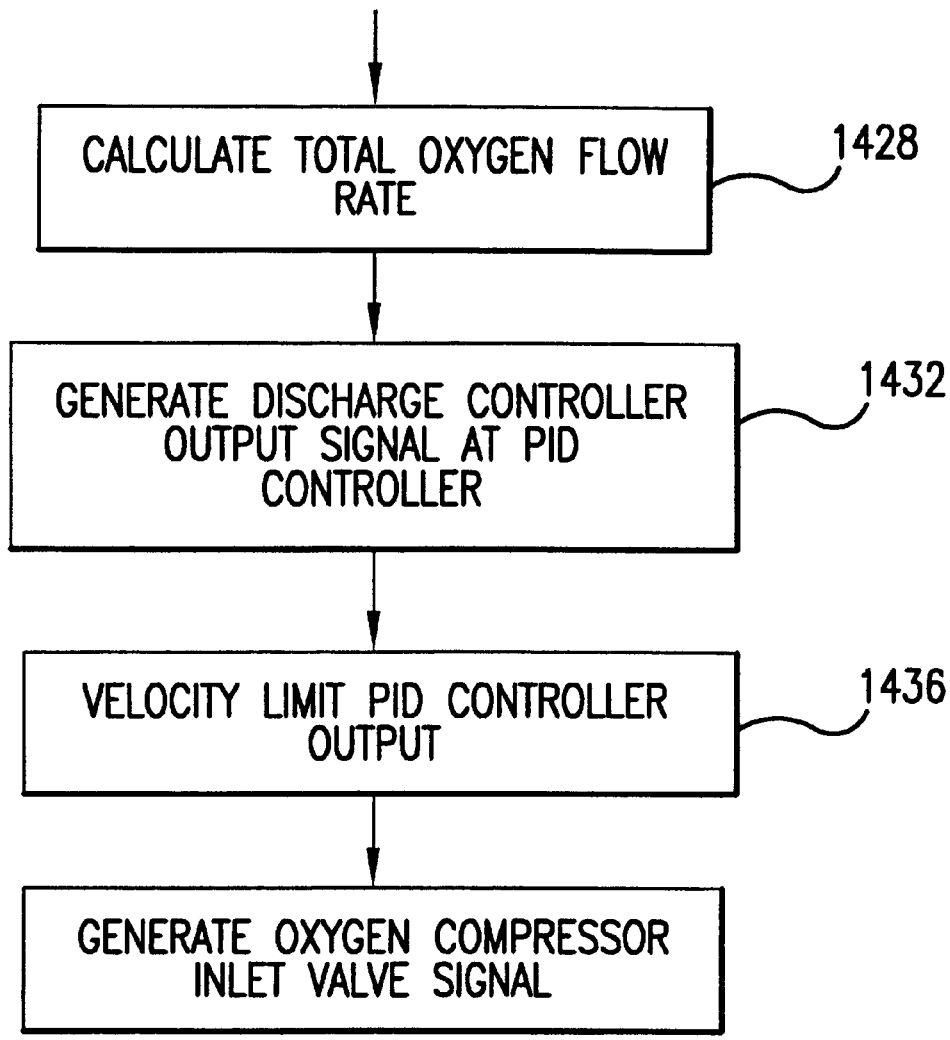

FIGS. 14A and 14B illustrate a flow diagram for the ASU/Oxygen Controls in accordance with one embodiment of the present invention. In step 1404, the oxygen valve position of the gasifier 112 and other gasifiers that may be operating simultaneously are compared at a high selector. In a step 1408, the following equation is solved: F(x)=0.002x+ 0.08, where F(x)>0.99, and x is the output of the high selector. F(x) is an oxygen setpoint modifier that is used to restrict oxygen at the ASU to cause the downstream gasifier oxygen valves to open to the point where they release control of the oxygen to the ASU.

In a step 1412, the following equation is solved: F(y)= 0.002y+0.81, where F(y)>1.0, and y is the oxygen valve position of the gasifier 112. F(y) is an oxygen setpoint modifier used to counteract the oxygen setpoint modifier F(x) of the step 820. In a step 1416, the actual oxygen setpoint value is divided by F(y) at a divider. The actual oxygen setpoint value is calculated by the operator and entered into the system. In a step 1420, the output of the divider and other similar outputs from other gasifiers are added at a first adder. In a step 1424, the output of the first adder is multiplied at a multiplier by F(x) obtained in step 1408. The multiplier outputs a discharge controller setpoint value. The discharge controller setpoint value represents the combined total oxygen setpoint value, that is, the discharge of the ASU.

In a step 1428, the oxygen flow rate from all gasifiers are added at a second adder and a total oxygen flow rate is calculated. In a step 1432, a PID controller receives the discharge controller setpoint and the total oxygen value setpoint. The PID controller outputs a discharge controller output signal. In a step 1436, the output of the PID controller is velocity limited at a velocity limiter. In a step 1440, the velocity limited discharge controller output signal is received at a low selector along with outputs from other ASU controllers (e.g., compressor suction flow controller, ASU suction vent controller) and compressor protection controllers. The output of the low selector is the oxygen compressor inlet valve signal.

10. Oxygen Header Vent Valve Controls

In the gasification system 100, a common line, known as the "oxygen header", is used to distribute oxygen among various gasifiers. During an emergency condition, the oxygen in the header is vented through header valves. The amount of oxygen vented through the header vent valves is controlled by adjusting the header vent valves.

Figure 15A:
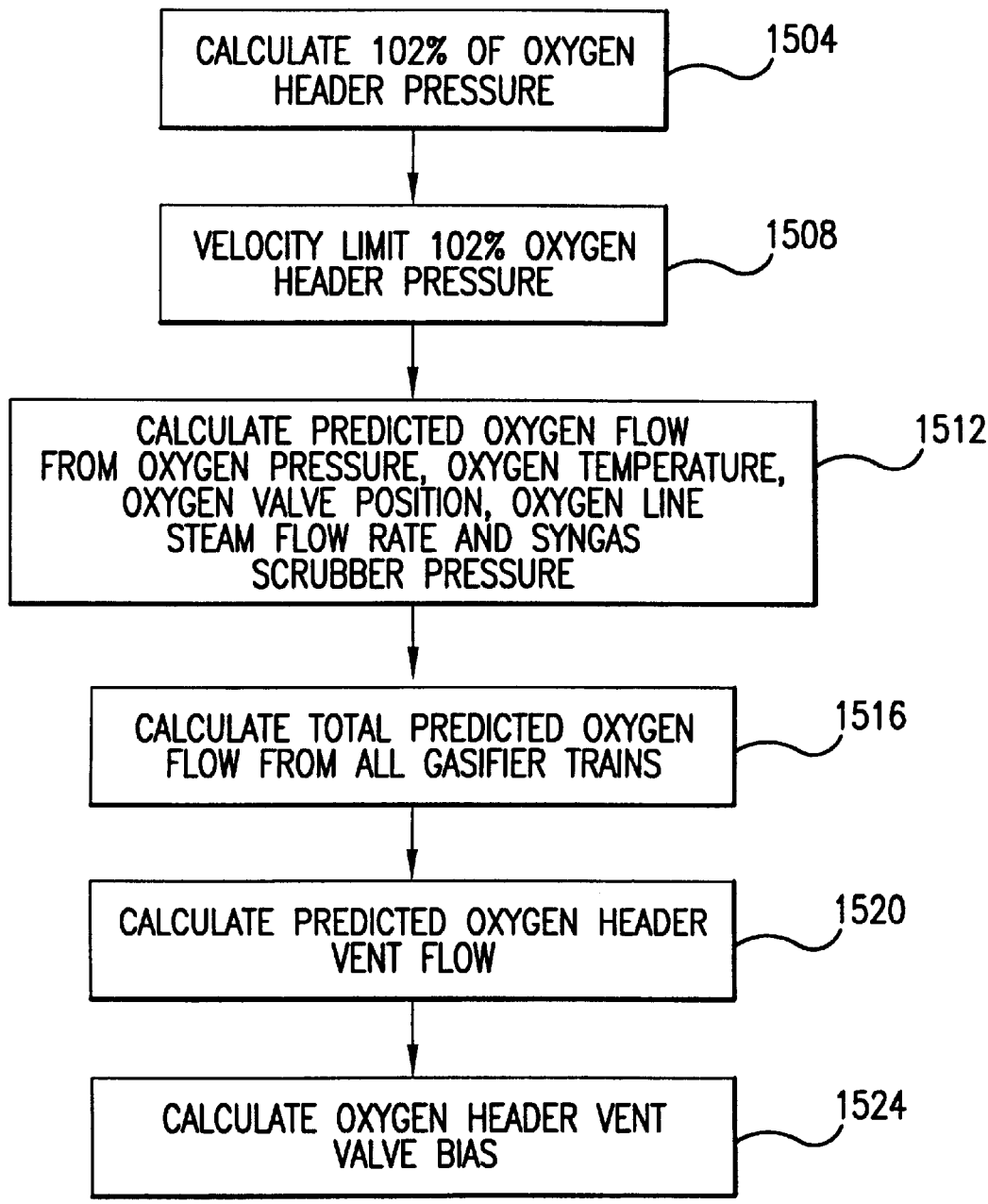
FIGS. 15A and 15B illustrate a flow diagram for controlling oxygen header vent valves.
Figure 15B:
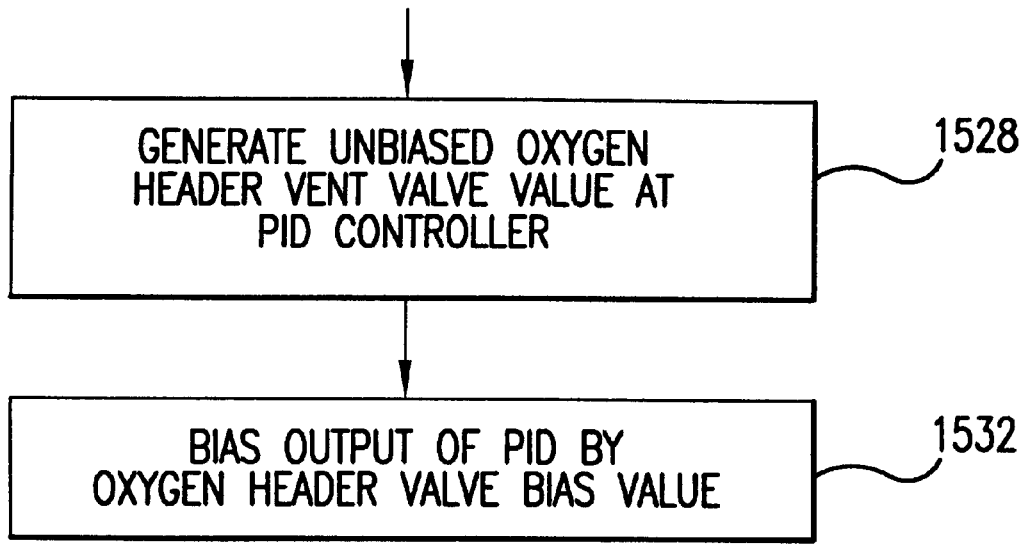

FIGS. 15A and 15B illustrate a flow diagram for controlling the oxygen header vent valves. In a step 1504, an oxygen header pressure signal is multiplied by 1.02 at a multiplier. In a step 1508, the output of the multiplier is velocity limited at a velocity limiter. The output of the velocity limiter is the oxygen header control setpoint value.

In a step 1512, a predicted oxygen flow is calculated from the oxygen pressure, the oxygen temperature, the oxygen valve position, the oxygen line steam flow rate and the syngas scrubber pressure. The oxygen pressure is measured by one or more pressure transmitters in the oxygen line. The oxygen temperature is measured by one or more thermocouples in the oxygen line. The oxygen line steam flow rate calculation was described earlier. The syngas scrubber pressure is measured by a pressure transmitter in a syngas scrubber.

The predicted oxygen flow can be calculated by treating the gasifier oxygen valve and the gasifier feed injector as two restrictions in series. The flow through a restriction is a function of the upstream and down stream pressures and the size of the restrictions. The down stream pressure for the feed injector is the syngas gas scrubber pressure. The upstream pressure for the feed injector cannot be directly measured. So it is instead inferred from the steam flow to the oxygen line upstream of the feed injector. The inferred pressure also serves as the downstream pressure for the oxygen valve restriction. As the oxygen valve opens and closes, the value of its restriction changes. Multiple iterative equations must be used to determine the impact of the oxygen valves when it is above or below its designed normal position.

In one embodiment, the predicted oxygen flow is calculated by the equation provided below. However, it should be understood that many other types of equations can be easily used to compute the predicted oxygen flow. One skilled in the art can easily substitute alternative equations to compute the predicted oxygen flow.

$$P = P_{low}, \tag{a}$$

when $Z \leq \dfrac{\overline{Z}}{\sqrt{2}}$, and by:

$$P = P_{low} \cdot 2\left(-2 \cdot \dfrac{Z^2}{\overline{Z}^2}\right) + P_{high}\left(2 \cdot \dfrac{Z^2}{\overline{Z}^2} - 1\right), \tag{b}$$

when $\overline{Z} > Z > \dfrac{\overline{Z}}{\sqrt{2}}$, and by:

$$P = P_{high}, \tag{c}$$

when $Z \geq \overline{Z}$, where:

$$P_{low} = P_{scrubber} + \overline{\Delta P_{FI}} \cdot \dfrac{Z^2}{\overline{Z}^2} \cdot \left(\dfrac{\dfrac{P_{oxygen} + P_0}{P_{oxygen}}}{0.3 + 0.7 \cdot \dfrac{P_{scrubber} + P_0}{P_{scrubber}}}\right)^2, \tag{d}$$

and:

$$P_{high} = P_{oxygen} - \overline{\Delta P_{FV}} \cdot \dfrac{\dfrac{P_{oxygen} - P_{scrubber}}{\overline{P_{oxygen}} - \overline{P_{scrubber}}}}{\dfrac{Z^3}{\overline{Z}^3}}, \tag{e}$$

and:

P = the predicted feed injector inlet pressure, in psig, $P_{low}$ = the low oxygen flow controller output predicted feed injector inlet pressure, in psig, Z = the oxygen flow controller output, in %, $\overline{Z}$ = the oxygen flow controller NOC output, in %

$P_{high}$ = the high oxygen flow controller output predicted feed injector inlet pressure, in psig, $P_{scrubber}$ = the syngas scrubber pressure, in psig, $\overline{\Delta P_{FI}}$ = the feed injector NOC differential pressure, in psi, $P_{oxygen}$ = the oxygen pressure, in psig, $\overline{P_{oxygen}}$ = the absolute oxygen NOC pressure, in psia, $\overline{P_{scrubber}}$ = the absolute syngas scrubber NOC pressure, in psia, $\overline{\Delta P_{FV}}$ = the oxygen valve NOC differential pressure, in psi.

The predicted oxygen pressure is constraint by:

$$P_{oxygen} - 10 > P > P_{scrubber} + 10, \tag{f}$$

where:

$P_{oxygen}$ = the oxygen pressure, in psig,.

P = the predicted feed injector inlet pressure, in psig, and $P_{scrubber}$ = the syngas scrubber pressure, in psig.

The predicted oxygen flow is calculated by:

$$q = \left(1 - \dfrac{Z^4}{\overline{Z}^4}\right) \cdot q_{FV} + \dfrac{Z^4}{\overline{Z}^4} \cdot q_{FI}, \tag{g}$$

when $Z < \overline{Z}$, and by:

$$q = q_{FI}, \tag{h}$$

when $Z \geq \overline{Z}$, where:

$$q_{FV} = \overline{q_{FV}} \cdot \dfrac{Z^2}{\overline{Z}^2} \cdot \dfrac{P_{oxygen} - P}{\overline{\Delta P_{FV}}} \cdot \dfrac{\overline{T}}{T + T_0} \cdot \dfrac{P_{oxygen} + P_0}{\overline{P_{oxygen}}}, \tag{i}$$

and:

-continued $$q_{FI} = \overline{q_{FI}}\sqrt{\frac{P-P_{scrubber}}{\overline{\Delta P_{FI}}} \cdot \frac{P+P_0}{\overline{P}} \cdot \frac{\overline{T}}{T+T_0}} - m \cdot \quad (j)$$

$$\frac{379.5}{18.01} \cdot \sqrt{\frac{\overline{T_{steam}}}{T} \cdot \frac{18.01}{32}},$$

and:

$q$ = the predicted oxygen flow, in scfh, $Z$ = the oxygen flow controller output, in %, $\overline{Z}$ = the oxygen flow controller NOC output, in %, $q_{FV}$ = the predicted oxygen valve flow, in scfh $q_{FI}$ = the predicted feed injector oxygen flow, in scfh, $\overline{q_{FV}}$ = the predicted oxygen valve NOC flow, in scfh, $P_{oxygen}$ = the oxygen pressure, in psig, $P$ = the predicted feed injector inlet pressure, at least $0.3 \cdot P_{oxygen}$, in psig, $\overline{\Delta P_{FV}}$ = the oxygen valve NOC differential pressure, in psi, $\overline{T}$ = the absolute oxygen NOC temperature, in ° R, $T$ = the oxygen temperature, in ° F., $T_0$ = the absolute temperature conversion, usually 459.69° F., $\overline{P_{oxygen}}$ = the absolute oxygen NOC pressure, in psia, $P_0$ = the absolute pressure conversion, usually 14.69 psi, $\overline{q_{FI}}$ = the feed injector NOC flow, in scfh, $P_{scrubber}$ = the syngas scrubber pressure, at least $0.3 \cdot P$, in psig, $\overline{\Delta P_{FI}}$ = the feed injector NOC differential pressure, in psi, $\overline{P}$ = the absolute predicted feed injector inlet NOC pressure, in psia, $m$ = the compensated steam mass flow, in $\frac{lb}{b}$, and $\overline{T_{steam}}$ = the absolute steam NOC temperature, in ° R.

In a step 1516, the predicted oxygen flow is added to predicted oxygen flows from other gasifier trains at an adder. In a step 1520, the total predicted oxygen flow is subtracted from the design oxygen header flow value and a predicted oxygen header vent flow is obtained. The design oxygen header flow value is a constant, which represents the amount of oxygen that the oxygen pipes are designed to carry. In a step 1524, an oxygen header vent valve bias value is calculated from the predicted oxygen header vent flow and an oxygen header vent valve critical flow. The oxygen header vent valve bias calculation is described in the Texaco Design Document. The oxygen header vent valve critical flow is the maximum allowable flow through the vent valve.

In a step 1528, a PID controller receives the oxygen header control setpoint value and the oxygen header pressure signal. The PID controller outputs an unbiased oxygen header vent valve signal. Finally, in a step 1532, the output of the PID controller is biased by the oxygen header valve bias value and a biased oxygen header vent valve signal is obtained. The oxygen header vent valve signal is used to adjust the vent valves of the oxygen header.

11. Syngas Header Pressure Control

As stated before, the syngas is transported from the gasifier by one or more syngas headers. Generally, the operator enters a normal pressure control setpoint, also called the syngas header pressure setpoint. The syngas header pressure setpoint is then used for high pressure control, low pressure control and "low low" pressure control.

Figure 16:
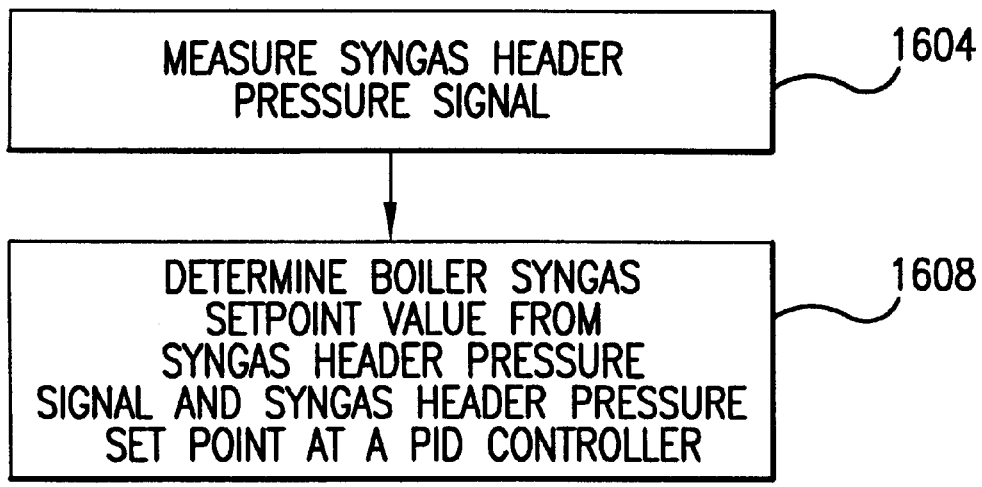
FIG. 16 is a flow diagram of a method for a normal pressure control of a syngas header.

FIG. 16 is a flow diagram of a method for determining the normal pressure control of the syngas header. In a step 1604, the syngas header pressure signal is measured by one or more pressure transmitters in the syngas header. In a step 1608, a PID controller receives the syngas header pressure setpoint and the syngas header pressure signal. The PID controller outputs a boiler syngas setpoint value. The boiler refers to a boiler downstream of the gasifier, which intakes the syngas and burns the syngas to generate power. The boiler syngas setpoint value represents the amount of syngas the boiler should consume.

Figure 17A:
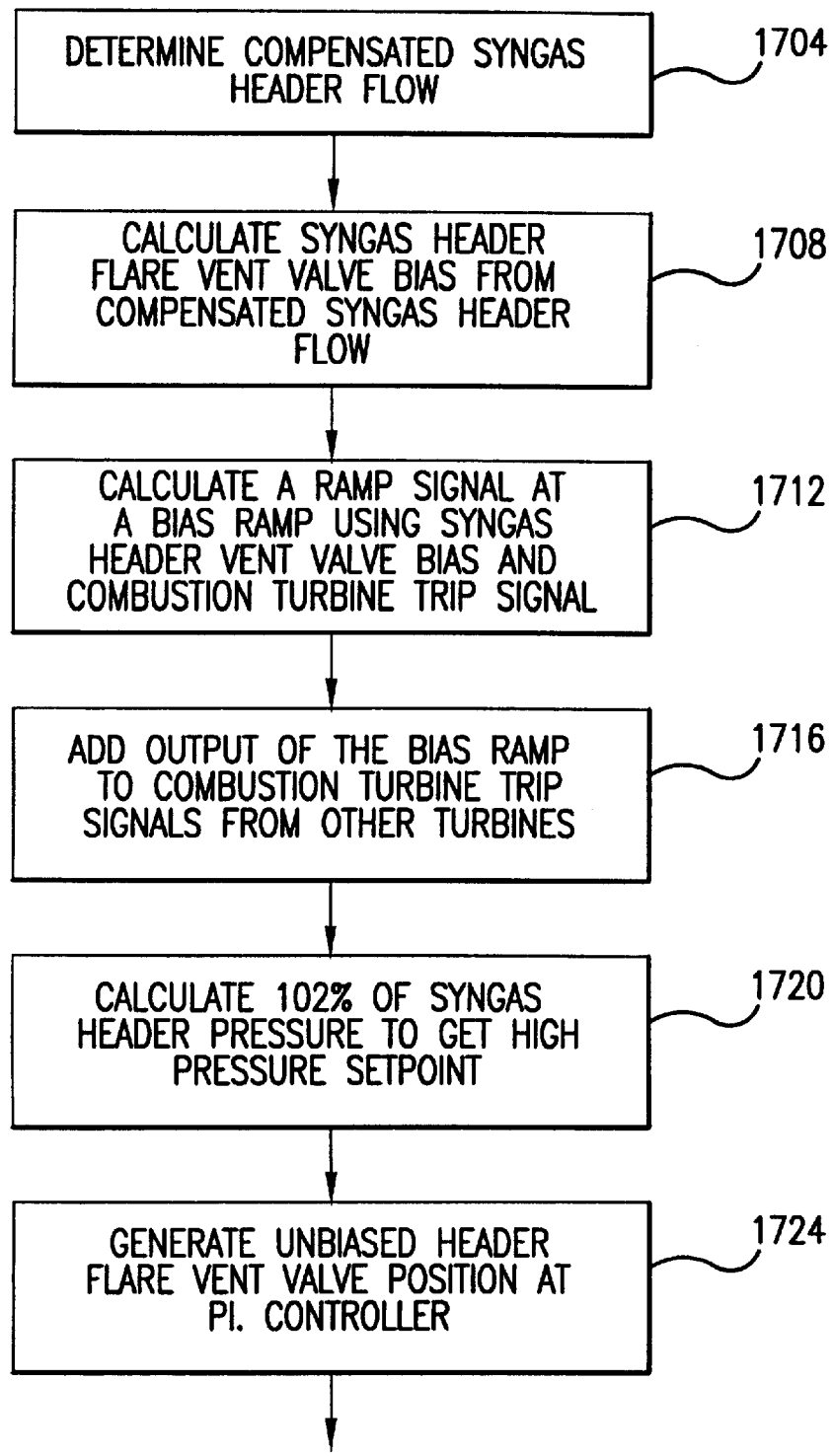

The present invention provides for the control of high pressure in the syngas header. FIGS. 17A and 17B illustrate a flow diagram for a high pressure control of the syngas header. In a step 1704, the syngas header flow rate, the syngas header temperature and the syngas header pressure signal are received at a flow compensator. The flow compensator calculates a compensated syngas header flow. In a step 1708, a syngas header flare vent valve bias is calculated from the compensated syngas header flow, the syngas header temperature and the maximum allowable flow through syngas header valve. The syngas header flare vent valve bias is calculated from the following equation:

$$\Delta Z = \frac{q}{q_R} \cdot \frac{P_R}{P+P_0} \cdot \sqrt{\frac{T+T_0}{T_R}} \cdot 100,$$

where, $\Delta Z$ = high override clean syngas pressure controller output bias, in %, $q$ = Predicted compensated syngas flow, in scfh, $q_R$ = Syngas design flow, in scfh, $P_R$ = absolute clean syngas design pressure, in psia, $P$ = Clean syngas pressure, in psig, $P_0$ = Absolute pressure conversion, usually 14.696 psi, $T$ = Clean syngas temperature,in ° F., $T_0$ = Absolute temperature conversion, usually 459.69 ° F., and, $T_R$ = Absolute clean syngas design temperature, in ° R.

In a step 1712, the syngas header flare vent valve bias and a combustion turbine trip signal is received at a bias ramp. In a step 1716, the output of the bias ramp is added to other combustion turbine trip signals from other turbines at an adder. In a step 1724, the syngas header pressure setpoint is multiplied by 1.02 at a multiplier. The output of the multiplier is the high pressure setpoint. In a step 1720, the syngas header pressure signal and the high pressure setpoint are received at a PID controller. The PID controller outputs when the syngas header pressure increases by more than 2% of the high pressure setpoint. In a step 1728, the output of the PID controller is biased by the output of the adder and the syngas header flare vent valve position is obtained.

FIG. 18 is a flow diagram of the method for a low pressure control of the syngas header. In a step 1804, a gasifier trip signal and a ramp start signal is received at a bias ramp. The ramp start signal is entered by the operator. In a step 1808, the syngas header pressure setpoint is multiplied by 0.98 at a multiplier and a low pressure setpoint. In other words, the low pressure setpoint is set at 98% of the syngas header pressure setpoint.

In a step 1812, a PID controller receives the syngas header pressure signal and the low pressure setpoint and outputs an unbiased low syngas pressure signal. In a step 1816, the unbiased low syngas pressure signal is biased by the output of the bias ramp to obtain the low syngas presure signal.

Figure 19:
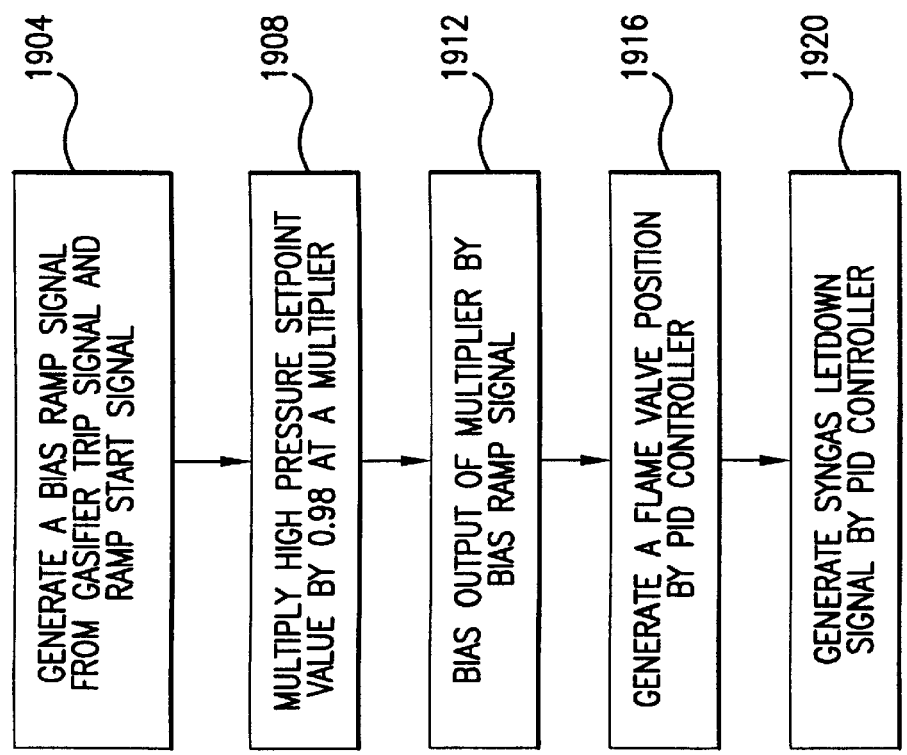
FIG. 19 is a flow diagram of a method for gasification pressure control.

FIG. 19 is a flow diagram of a method for a gasification pressure control. In a step 1904, a gasifier trip signal and a ramp start signal is received at a bias ramp. The gasifier trip signal is produced when there is a gasifier shutdown. The ramp start signal is a constant value. The bias ramp generates a bias signal that will be used to unload gasifier syngas inventory into the syngas header.

In a step 1908, the high pressure setpoint value is multiplied by 0.98 at a multiplier. In a step 1916, the output of the multiplier is biased by the output of the bias ramp, i.e., the bias signal, and the normal pressure setpoint value is obtained. In a step 1912, a first PID controller receives a scrubber pressure and the high pressure setpoint. The scrubber pressure is measured by pressure transmitters in the overhead of the syngas scrubber. The first PID controller outputs a flare valve position. In a step 1920, a second PID controller receives the scrubber pressure and the normal pressure setpoint and generates a syngas letdown valve controller signal. The automatic demand value noted earlier is derived from the carbon pump speed and the low syngas pressure signal.

Figure 20:
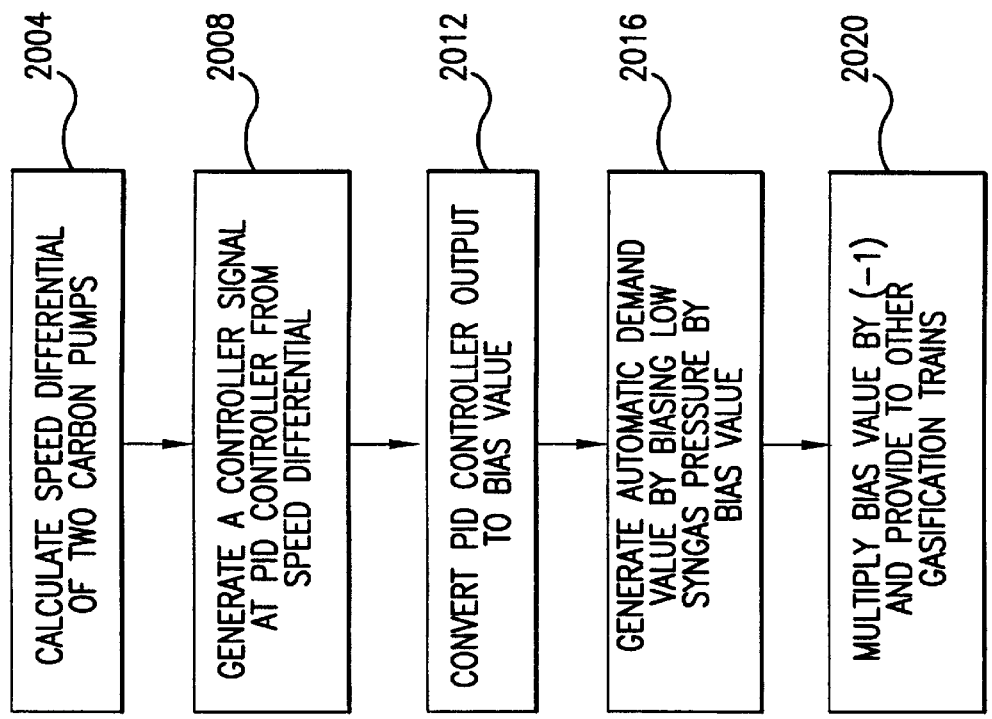
FIG. 20 is a flow diagram of a method for determining an automatic demand.

FIG. 20 is a flow diagram of a method for determining the automatic demand. In a step 2004, the speed differential of two carbon pumps (from two gasifier trains) is calculated. The difference represents a predicted train differential. In a step 2008, a PID controller receives the predicted train differential and a zero (0) setpoint value. The output of the PID controller is between 0 and 100%. In a step 2012, the output of the PID controller is converted to a bias value. In one embodiment, the output of the PID controller is converted to a value between −10 and +10. In a step 2016, the low syngas pressure signal is biased by the bias value and the automatic demand is generated. In a step 2020, the bias value is multiplied by −1 and is provided to the other gasification train as an automatic demand.

12. Implementation of ICS in a Computer system

Figure 21:
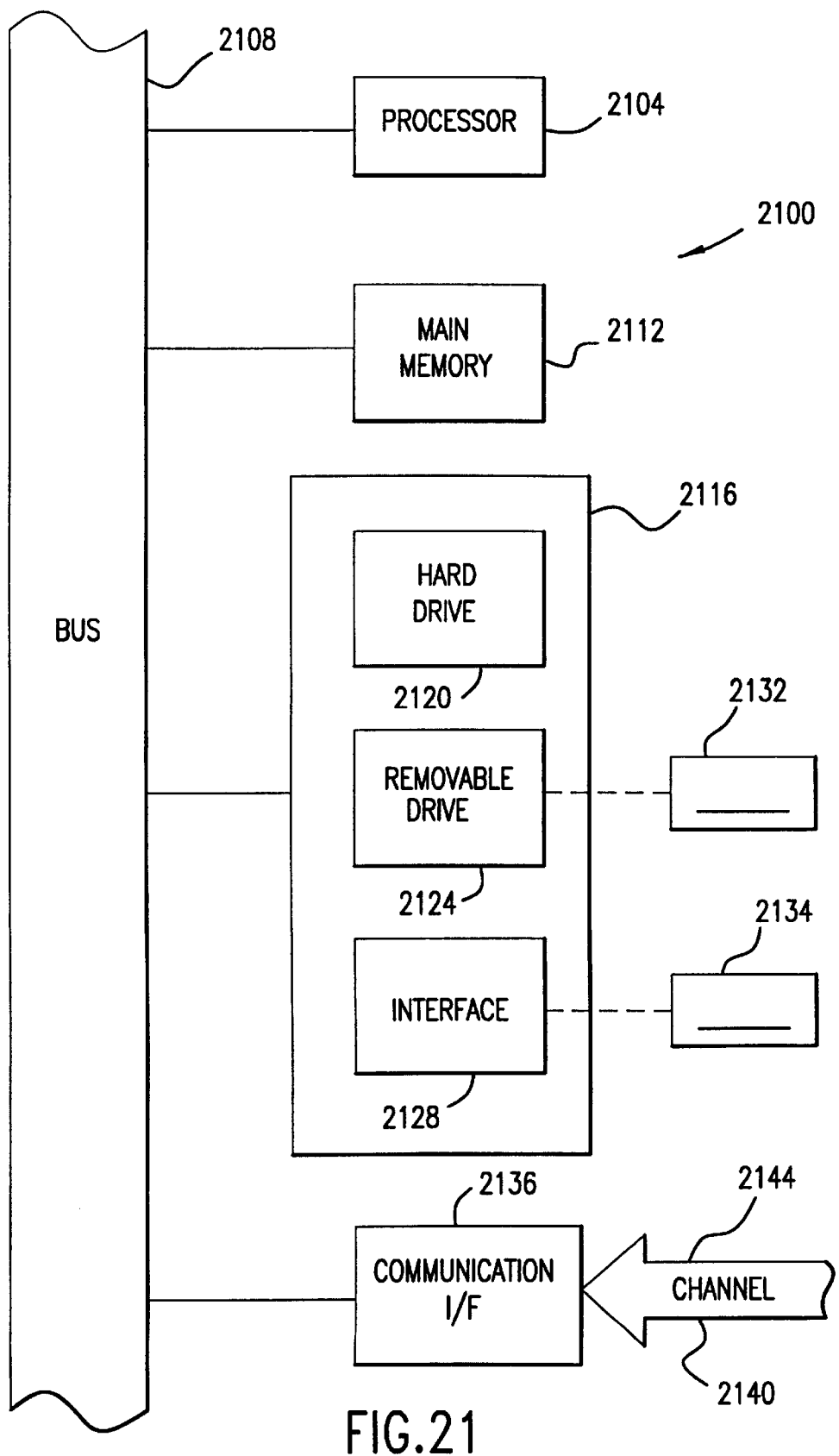
FIG. 21 illustrates a computer system capable of carrying out the functionality of the present invention.

In one embodiment of the present invention, the ICS 216 is implemented by a computer system capable of carrying out the functionality of the ICS 216 described above, and is shown in more detail in FIG. 21. A computer system 2100 includes one or more processors, such as a processor 2104. The processor 2104 is connected to a communication bus 2108. Various software embodiments are described in terms of this exemplary computer system. After reading this description, it will become apparent to a person skilled in the relevant art how to implement the invention using other computer systems and/or computer architectures.

The computer system 2100 also includes a main memory 2112, preferably a random access memory (RAM), and. can also include a secondary memory 2116. The secondary memory 2116 can include, for example, a hard disk drive 2120 and/or a removable storage drive 2124, representing a floppy disk drive, a magnetic tape drive, an optical disk drive, etc. The removable storage drive 2124 reads from and/or writes to a removable storage unit 2132 in a well known manner. The removable storage unit 2132 represents a floppy disk, magnetic tape, optical disk, etc. which is read by and written to by the removable storage drive 2124. As will be appreciated, the removable storage unit 2132 includes a computer usable storage medium having stored therein computer software and/or data.

In alternative embodiments, the secondary memory 2116 may include other similar means for allowing computer programs or other instructions to be loaded into the computer system 2100. Such means can include, for example, a removable storage unit 2134 and an interface 2128. Examples of such can include a program cartridge and cartridge interface (such as that found in video game devices), a removable memory chip (such as an EPROM, or PROM) and associated socket, and other removable storage units 2134 and interfaces 2128 which allow software and data to be transferred from removable storage unit 2134 to the computer system 2100.

The computer system 2100 can also include a communications interface 2136. The communications interface 2136 allows software and data to be transferred between the computer system 2100 and external devices. Examples of the communications interface 2100 can include a modem, a network interface (such as an Ethernet card), a communications port, a PCMCIA slot and card, etc. Software and data transferred via the communications interface 2136 are in the form of signals 2140 that can be electronic, electromagnetic, optical or other signals capable of being received by the communications interface 2136. The signals 2140 are provided to communications interface via a channel 2144. The channel 2144 carries the signals 2140 and can be implemented using wire or cable, fiber optics, a phone line, a cellular phone link, an RF link and other communications channels.

In this document, the terms "computer program medium" and "computer usable medium" are used to generally refer to media such as the removable storage drive 2124, a hard disk installed in the hard disk drive 2120, and the signals 2140. These computer program products are means for providing software to the computer system 2100.

Computer programs (also called computer control logic) are stored in the main memory 2112 and/or the secondary memory 2116. Computer programs can also be received via the communications interface 2136. Such computer programs, when executed, enable the computer system 2100 to perform the features of the present invention as discussed herein. In particular, the computer programs, when executed, enable the processor 2104 to perform the features of the present invention.

In an embodiment where the invention is implemented using software, the software may be stored in a computer program product and loaded into the computer system 2100 using the removable storage drive 2124, the hard drive 2120 or the communications interface 2136. The control logic (software), when executed by the processor 2104, causes the processor 2104 to perform the functions of the invention as described herein.

In another embodiment, the invention can be implemented primarily in hardware using, for example, hardware components such as application specific integrated circuits (ASICs). Implementation of such a hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for controlling an oxygen to carbon (O/C) ratio in a gasification plant, the gasification plant converting oxygen and hydrocarbon feedstock into syngas composed primarily of hydrogen (H$_2$) and carbon monoxide (CO), the method comprising the steps of:

determining a syngas demand based on load constraints, the syngas demand being representative of a desired output of a gasifier;

determining oxygen and carbon setpoint values based on an oxygen to carbon (O/C) ratio setpoint value and the syngas demand;

adjusting oxygen and carbon valves in the gasification plant based on the oxygen and carbon setpoint values, respectively;

converting a carbon flow rate to a demand controller signal by a macro unit conversion;

receiving the demand controller signal and a demand controller setpoint value at a PID controller and generating a PID controller signal;

receiving the PID controller signal and an automatic demand value at a signal selector and generating a selected demand value;

receiving the selected demand value and a syngas demand override value at a low selector and generating a load constrained demand value;

converting the load constrained demand value to a bias value; and biasing an oxygen flow rate with the bias value.

2. A method for controlling an oxygen to carbon (O/C) ratio in a gasification plant, the gasification plant converting oxygen and hydrocarbon feedstock into syngas composed primarily of hydrogen (H$_2$) and carbon monoxide (CO), the method comprising the steps of:

determining a syngas demand based on load constraints, the syngas demand being representative of a desired output of a gasifier;

determining oxygen and carbon setpoint values based on an oxygen to carbon (O/C) ratio setpoint value and the syngas demand;

adjusting oxygen and carbon valves in the gasification plant based on the oxygen and carbon setpoint values, respectively;

converting a carbon flow rate to a demand controller signal by a macro unit conversion;

receiving the demand controller signal and a demand controller setpoint value at a PID controller and generating a PID controller signal;

receiving the PID controller signal and an automatic demand value at a signal selector and generating a selected demand value;

receiving the selected demand value and a syngas demand override value at a low selector and generating a load constrained demand value;

converting the load constrained demand value to a bias value, and biasing an oxygen flow rate with the bias value;

wherein the carbon flow rate is converted to the syngas demand signal by the following equation:

$$m = F * 12.011 * (24/2000),$$

where, m represents the syngas demand and F is a slurry flow in lb-mol/hour.

3. The method as recited in claim 1, wherein the syngas demand override value calculation comprises the steps of:

determining a constrained controller signal at a high selector;

calculating 98% of a constrained controller setpoint value; and determining the syngas demand override value from the 98% constrained controller setpoint value and the constrained controller signal.

4. A method for determining an oxygen setpoint value in a gasification plant, the gasification plant converting oxygen and hydrocarbon feedstock into syngas composed primarily of hydrogen (H$_2$) and carbon monoxide (CO), the method comprising the steps of:

multiplying an oxygen setpoint value by a carbon flow rate to generate an oxygen setpoint high limit;

determining an oxygen demand constrained by a carbon flow rate at a low selector from a syngas demand and the oxygen setpoint high limit;

multiplying the oxygen setpoint high limit by a predetermined factor to generate an oxygen setpoint low limit, and determining a constrained oxygen setpoint value at a high selector from the oxygen setpoint low limit and the oxygen demand constrained by the carbon flow rate.

5. The method as recited in claim 4, wherein the predetermined factor is 0.98.

6. A method for determining a carbon setpoint value in a gasification plant, the gasification plant converting oxygen and hydrocarbon feedstock into syngas composed primarily of hydrogen (H$_2$) and carbon monoxide (CO), the method comprising the steps of:

determining a carbon setpoint low limit at a high selector from an oxygen flow rate and a syngas demand;

multiplying the oxygen flow rate by a predetermined factor to generate a carbon setpoint high limit;

determining a constrained carbon setpoint value at a low selector from the carbon setpoint high limit and the carbon setpoint low limit; and dividing the constrained carbon setpoint by a O/C ratio setpoint to generate the carbon control setpoint value.

7. The method as recited in claim 6, wherein the predetermined factor is 1.02.

8. A method for controlling an oxygen flow in a gasification plant, the gasification plant converting oxygen and hydrocarbon feedstock into syngas composed primarily of hydrogen (H$_2$) and carbon monoxide (CO), the method comprising the steps of:

calculating a compensated oxygen flow from an oxygen flow rate and oxygen temperature at a flow compensator;

converting the compensated oxygen flow to a molar oxygen flow at a molar converter;

multiplying the molar oxygen flow by an oxygen purity value to generate an oxygen flow signal;

receiving the oxygen flow signal and an oxygen control setpoint value at a PID controller and generating a PID controller output signal;

velocity limiting the PID controller output signal at a velocity limiter; and adjusting an oxygen valve using the velocity limited PID controller output signal.

9. The method as recited in claim 8, wherein the compensated oxygen flow is calculated by the following equation:

$$\tilde{q} = q \cdot \sqrt{\frac{P+P_0}{P_R} \cdot \frac{T_R}{T+T_0}},$$

where, $\tilde{q}$ = compensated oxygen flow, $q$ = oxygen flow, $P$ = oxygen pressure in psig, $P_0$ = absolute pressure conversion, $P_R$ = absolute oxygen design pressure in psia, $T$ = oxygen temperature in °F., $T_0$ = absolute temperature conversion, and $T_R$ = absolute oxygen design temperature, in °R.

10. The method as recited in claim 8, wherein the compensated oxygen flow is converted to a molar oxygen flow by the following equation:

$$F=q*(2/379.5)$$

where, q=volumetric oxygen flow in standard cubic feet/hour (scsh), and

F=elemental oxygen flow in lb-mol/hour.

11. A method for controlling a carbon flow in a gasification plant, the gasification plant converting oxygen and hydrocarbon feedstock into syngas composed primarily of hydrogen ($H_2$) and carbon monoxide (CO), the method comprising the steps of:

calculating a carbon flow rate from a charge pump speed;

selecting an actual carbon flow rate from an inferred carbon flow rate and a measured carbon flow rate at a signal selector;

converting the carbon flow rate to a molar carbon flow rate at a molar converter;

generating a carbon flow signal from the molar carbon flow rate, a velocity limited slurry concentration and a velocity limited carbon content;

generating a carbon pump speed signal at PID controller using the carbon flow signal and a carbon control setpoint value; and adjusting the speed of a carbon pump by the carbon pump speed signal.

12. The method as recited in claim 11, wherein the carbon flow rate is calculated from the following equation:

$$q=q_r \cdot (s/s_r)$$

where, q=charge pump flow in gpm, $q_r$=charge pump design flow, s=charge pump speed in rpm, and $s_r$=charge pump design speed in rpm.

13. The method as recited in claim 11, wherein the carbon flow rate is converted to a molar carbon flow rate by the following equation:

$$F=[\{(q*8.021)\}/\{12.011*(0.017-0.000056*x_{slurry})\}] \\ *(0.01x_{slurry})*(0.01x_{coke}),$$

where,

F=carbon flow in lb-mol/hour, q=slurry flow, $X_{coke}$=coke carbon concentration, and $X_{slurry}$=slurry coke concentration.

14. The method as recited in claim 11, wherein the carbon flow rate is converted to a molar carbon flow rate by the following equation:

$$F=(q*S_g*8.021/12.011)*0.01*X_c$$

Where, q=carbon flow in gal/min,

F=elemental carbon flow in lb-mol/hr, $S_g$=specific gravity of carbon, and $X_c$=carbon content of the liquid.

15. A method for controlling moderators in a gasification plant, the gasification plant converting oxygen and hydrocarbon feedstock into syngas composed primarily of hydrogen ($H_2$) and carbon monoxide (CO), the method comprising the steps of:

generating a compensated oxygen line steam flow signal at a first flow compensator from an oxygen line steam flow rate, a steam temperature and a steam pressure;

generating a compensated carbon line steam flow signal at a second flow compensator from a carbon line steam flow rate, the steam pressure and the steam temperature;

adding the compensated oxygen line steam flow signal and the compensated carbon line steam flow signal at a first adder to generate a total steam flow signal;

determining a total moderator flow from the total steam flow signal and a recycled black-water flow;

dividing the total moderator flow by the carbon flow at a first divider to determine a moderator/carbon ratio;

determining a desired oxygen line steam rate from the moderator/carbon ratio signal and a moderator/carbon setpoint value at a ratio controller;

determining an oxygen line steam valve signal from the desired oxygen line steam rate and the oxygen line steam flow signal;

adjusting an oxygen line steam valve by the oxygen line steam valve signal;

determining a carbon line steam valve signal from the compensated carbon line steam flow signal and a carbon line steam flow setpoint value; and adjusting a carbon line steam valve by the carbon line steam valve signal.

16. The method as recited in claim 15, wherein the compensated oxygen line steam flow is calculated by the following equation:

$$\tilde{q} = q \cdot \sqrt{\frac{P+P_0}{P_R} \cdot \frac{T_R}{T+T_0}},$$

where, $\tilde{q}$ = compensated steam flow, $q$ = steam flow, $P$ = steam pressure in psig, $P_0$ = absolute pressure conversion, $P_R$ = absolute steam design pressure in psia, -continued $T$ = steam temperature in °F., $T_0$ = absolute temperature conversion, and $T_R$ = absolute steam design temperature, in °R.

17. The method as recited in claim 15, wherein the compensated carbon line steam flow is calculated by the following equation:

$$\tilde{q} = q \cdot \sqrt{\frac{P+P_0}{P_R} \cdot \frac{T_R}{T+T_0}},$$

where, $\tilde{q}$ = compensated steam flow, $q$ = steam flow, $P$ = steam pressure in psig, $P_0$ = absolute pressure conversion, $P_R$ = absolute steam design pressure in psia, $T$ = steam temperature in °F., $T_0$ = absolute temperature conversion, and $T_R$ = absolute steam design temperature, in °R.

18. A method for controlling an air separation unit (ASU) that provides oxygen to a gasification plant, the gasification plant converting the oxygen and hydrocarbon feedstock into syngas composed primarily of hydrogen ($H_2$) and carbon monoxide (CO), the method comprising the steps of:
comparing oxygen valve positions of a plurality of gasifiers that are operating simultaneously at a high selector, and outputting a value x;
calculating F(x)=0.002x+0.08, where F(x)>0.99, and x is the output of the high selector; and
calculating F(y)=0.002y+0.81, where F(y)>1.0, and y is the oxygen valve position of a selected gasifier.

19. The method as recited in claim 18, further comprising the steps of:
dividing an actual oxygen setpoint value by F(y) at a divider;
adding the output of the divider and other divider outputs from other gasifiers at a first adder;
multiplying the output of the first adder by F(x) at a first multiplier and generating a discharge controller setpoint value, the discharge controller setpoint value representing the discharge of the ASU; and
adding oxygen flow rates from all gasifiers at a second adder and generating a total oxygen flow rate.

20. The method as recited in claim 19, further comprising the steps of:
receiving the discharge controller setpoint and the total oxygen value setpoint at a PID controller, and outputting a discharge controller output signal;
velocity limiting the discharge controller output signal; and
receiving the velocity limited discharge controller output signal at a low selector along with outputs from one or more compressor suction flow controllers, one or more ASU suction vent controllers and one or more compressor protection controllers, and outputting an oxygen compressor inlet valve signal.

21. A method for controlling high pressure of a syngas header in a gasification plant, the syngas header transporting syngas from a gasifier, the gasification plant converting oxygen and hydrocarbon feedstock into the syngas composed primarily of hydrogen ($H_2$) and carbon monoxide (CO), the method comprising the steps of:
receiving a syngas header flow rate, a syngas header temperature and a syngas header pressure signal at a flow compensator, and calculating a compensated syngas header flow; and
calculating a syngas header flare vent valve bias from the compensated syngas header flow, the syngas header temperature, and a maximum allowable flow through a syngas header valve.

22. A method for controlling high pressure of a syngas header in a gasification plant, the syngas header transporting syngas from a gasifier, the gasification plant converting oxyzen and hydrocarbon feedstock into the syngas composed primarily of hydrogen ($H_2$) and carbon monoxide (CO), the method comprising the steps of:
receiving a syngas header flow rate, a syngas header temperature and a syngas header pressure signal at a flow compensator, and calculating a compensated syngas header flow; and
calculating a syngas header flare vent valve bias from the compensated syngas header flow, the syngas header temperature, and a maximum allowable flow through a syngas header valve;
wherein the syngas header flare vent valve bias is calculated from the following equation:

$$\Delta Z = \frac{q}{q_R} \cdot \frac{P_R}{P+P_0} \cdot \sqrt{\frac{T+T_0}{T_R}} \cdot 100,$$

where, $\Delta Z$ = High override clean syngas pressure controller output bias, in %, $q$ = Predicted compensated syngas flow, in scfh, $q_R$ = Syngas design flow, in scfh, $P_R$ = Absolute clean syngas design pressure, in psia, $P$ = Clean syngas pressure, in psig, $P_0$ = Absolute pressure conversion, $T$ = Clean syngas temperature, in °F., $T_0$ = Absolute temperature conversion, and $T_R$ = Absolute clean syngas design temperature, in °R.

23. The method as recited in claim 22, further comprising the steps of:
receiving the syngas header flare vent valve bias and a combustion turbine trip signal at a bias ramp, and outputting a bias ramp signal;
adding the bias ramp signal to combustion turbine trip signals from other turbines at an adder, and outputting a total bias signal; and
multiplying a syngas header pressure setpoint value by 1.02 at a multiplier, and generating a high pressure setpoint.

24. The method as recited in claim 23, further comprising the steps of:
receiving a syngas header pressure signal and the high pressure setpoint at a PID controller, and outputting a PID controller output signal; and biasing the PID controller output signal with the total bias signal, and generating a syngas header flare vent valve position.

25. A program storage device readable by a machine, tangibly embodying a program of instructions executable by the machine to perform method steps of controlling an oxygen to carbon (O/C) ratio in a gasification plant, the gasification plant converting oxygen and feedstock into syngas composed primarily of hydrogen ($H_2$) and carbon monoxide (CO), the method steps comprising:

determining a syngas demand based on load constraints, the syngas demand being representative of a desired output of a gasifier;

determining oxygen and carbon setpoint values based on an oxygen to carbon (O/C) ratio setpoint value and the syngas demand;

adjusting oxygen and carbon valves in the gasification plant based on the oxygen and carbon setpoint values, respectively;

converting a carbon flow rate to a demand controller signal by a macro unit conversion;

receiving the demand controller signal and a demand controller setpoint value at a PID controller and generating a PID controller signal;

receiving the PID controller signal and an automatic demand value at a signal selector and generating a selected demand value;

receiving the selected demand value and a syngas demand override value at a low selector and generating a load constrained demand value;

converting the load constrained demand value to a bias value; and biasing an oxygen flow rate with the bias value.

26. A program storage device readable by a machine, tangibly embodying a program of instructions executable by the machine to perform method steps of controlling an oxygen to carbon (O/C) ratio in a gasification plant, the gasification plant converting oxygen and hydrocarbon feedstock into syngas composed primarily of hydrogen ($H_2$) and carbon monoxide (CO), the method steps comprising:

determining a syngas demand based on load constraints, the syngas demand being representative of a desired output of a gasifier;

determining oxygen and carbon setpoint values based on an oxygen to carbon (O/C) ratio setpoint value and the syngas demand;

adjusting oxygen and carbon valves in the gasification plant based on the oxygen and carbon setpoint values, respectively;

converting a carbon flow rate to a demand controller signal by a macro unit conversion;

receiving the demand controller signal and a demand controller setpoint value at a PID controller and generating a PID controller signal;

receiving the PID controller signal and an automatic demand value at a signal selector and generating a selected demand value;

receiving the selected demand value and a syngas demand override value at a low selector and generating a load constrained demand value;

converting the load constrained demand value to a bias value, and biasing an oxygen flow rate with the bias value;

wherein the carbon flow rate is converted to the syngas demand signal by the following equation:

$$m = F * 12.011 * (24/2000),$$

where, m represents the syngas demand and F is a slurry flow in lb-mol/hour.

27. The program storage device as recited in claim 25, wherein the syngas demand override value calculation comprises the steps of:

determining a constrained controller signal at a high selector;

calculating 98% of a constrained controller setpoint value; and determining the syngas demand override value from the 98% constrained controller setpoint value and the constrained controller signal.

28. A program storage device readable by a machine, tangibly embodying a program of instructions executable by the machine to perform method steps of determining an oxygen setpoint value in a gasification plant, the gasification plant converting oxygen and hydrocarbon feedstock into syngas composed primarily of hydrogen ($H_2$) and carbon monoxide (CO), the method steps comprising:

multiplying an oxygen setpoint value by a carbon flow rate to generate an oxygen setpoint high limit;

determining an oxygen demand constrained by a carbon flow rate at a low selector from a syngas demand and the oxygen setpoint high limit;

multiplying the oxygen setpoint high limit by a predetermined factor to generate an oxygen setpoint low limit, and determining a constrained oxygen setpoint value at a high selector from the oxygen setpoint low limit and the oxygen demand constrained by the carbon flow rate.

29. The program storage device as recited in claim 28, wherein the predetermined factor is 0.98.

30. A program storage device readable by a machine, tangibly embodying a program of instructions executable by the machine to perform method steps of determining a carbon setpoint value in a gasification plant, the gasification plant converting oxygen and hydrocarbon feedstock into syngas composed primarily of hydrogen ($H_2$) and carbon monoxide (CO), the method steps comprising:

determining a carbon setpoint low limit at a high selector from an oxygen flow rate and a syngas demand;

multiplying the oxygen flow rate by a predetermined factor to generate a carbon setpoint high limit;

determining a constrained carbon setpoint value at a low selector from the carbon setpoint high limit and the carbon setpoint low limit; and dividing the constrained carbon setpoint by a O/C ratio setpoint to generate the carbon control setpoint value.

31. The program storage device as recited in claim 30, wherein the predetermined factor is 1.02.

32. A program storage device readable by a machine, tangibly embodying a program of instructions executable by the machine to perform method steps of controlling an oxygen flow in a gasification plant, the gasification plant converting oxygen and hydrocarbon feedstock into syngas composed primarily of hydrogen ($H_2$) and carbon monoxide (CO), the method steps comprising:

calculating a compensated oxygen flow from an oxygen flow rate and oxygen temperature at a flow compensator;

converting the compensated oxygen flow to a molar oxygen flow at a molar converter;

multiplying the molar oxygen flow by an oxygen purity value to generate an oxygen flow signal;

receiving the oxygen flow signal and an oxygen control setpoint value at a PID controller and generating a PID controller output signal;

velocity limiting the PID controller output signal at a velocity limiter; and adjusting an oxygen valve using the velocity limited PID controller output signal.

33. The program storage device as recited in claim 32, wherein the compensated oxygen flow is calculated by the following equation:

$$\tilde{q} = q \cdot \sqrt{\frac{P+P_0}{P_R} \cdot \frac{T_R}{T+T_0}},$$

where, $\tilde{q}$ = compensated oxygen flow, $q$ = oxygen flow, $P$ = oxygen pressure in psig, $P_0$ = absolute pressure conversion, $P_R$ = absolute oxygen design pressure in psia, $T$ = oxygen temperature in °F., $T_0$ = absolute temperature conversion, and $T_R$ = absolute oxygen design temperature, in °R.

34. The program storage device as recited in claim 32, wherein the compensated oxygen flow is converted to a molar oxygen flow by the following equation:

$$F=q*(2/379.5)$$

where, q=volumetric oxygen flow in standard cubic feet/hour (scsh), and

F=elemental oxygen flow in lb-mol/hour.

35. A program storage device readable by a machine, tangibly embodying a program of instructions executable by the machine to perform method steps of controlling a carbon flow in a gasification plant, the gasification plant converting oxygen and hydrocarbon feedstock into syngas composed primarily of hydrogen ($H_2$) and carbon monoxide (CO), the method steps comprising:

calculating a carbon flow rate from a charge pump speed;

selecting an actual carbon flow rate from an inferred carbon flow rate and a measured carbon flow rate at a signal selector;

converting the carbon flow rate to a molar carbon flow rate at a molar converter;

generating a carbon flow signal from the molar carbon flow rate, a velocity limited slurry concentration and a velocity limited carbon content;

generating a carbon pump speed signal at PID controller using the carbon flow signal and a carbon control setpoint value; and adjusting the speed of a carbon pump by the carbon pump speed signal.

36. The program storage device as recited in claim 35, wherein the carbon flow rate is calculated from the following equation:

$$q=q_r \cdot (s/s_r)$$

where, q=charge pump flow in gpm, $q_r$=charge pump design flow, s=charge pump speed in rpm, and $s_r$=charge pump design speed in rpm.

37. The program storage device as recited in claim 35, wherein the carbon flow rate is converted to a molar carbon flow rate by the following equation:

$$F=[\{(q*8.021)\}/\{12.011*(0.017-0.000056*x_{slurry})\}] *(0.01x_{slurry})*(0.01_{xcoke}),$$

where,

F=carbon flow in lb-mol/hour, q=slurry flow, $X_{coke}$=coke carbon concentration, and $X_{slurry}$=slurry coke concentration.

38. The program storage device as recited in claim 36, wherein the carbon flow rate is converted to a molar carbon flow rate by the following equation:

$$F=(q*S_g*8.021/12.011)*0.01*X_c$$

where, q=carbon flow in gal/min,

F=elemental carbon flow in lb-mol/hr, $S_g$=specific gravity of carbon, and $X_c$=carbon content of the liquid.

39. A program storage device readable by a machine, tangibly embodying a program of instructions executable by the machine to perform method steps of controlling moderators in a gasification plant, the gasification plant converting oxygen and hydrocarbon feedstock into syngas composed primarily of hydrogen ($H_2$) and carbon monoxide (CO), the method steps comprising:

generating a compensated oxygen line steam flow signal at a first flow compensator from an oxygen line steam flow rate, a steam temperature and a steam pressure;

generating a compensated carbon line steam flow signal at a second flow compensator from a carbon line steam flow rate, the steam pressure and the steam temperature;

adding the compensated oxygen line steam flow signal and the compensated carbon line steam flow signal at a first adder to generate a total steam flow signal;

determining a total moderator flow from the total steam flow signal and a recycled black-water flow;

dividing the total moderator flow by the carbon flow at a first divider to determine a moderator/carbon ratio;

determining a desired oxygen line steam rate from the moderator/carbon ratio signal and a moderator/carbon setpoint value at a ratio controller;

determining an oxygen line steam valve signal from the desired oxygen line steam rate and the oxygen line steam flow signal;

adjusting an oxygen line steam valve by the oxygen line steam valve signal;

determining a carbon line steam valve signal from the compensated carbon line steam flow signal and a carbon line steam flow setpoint value; and adjusting a carbon line steam valve by the carbon line steam valve signal.

40. The program storage device as recited in claim 39, wherein the compensated oxygen line steam flow is calculated by the following equation:

$$\tilde{q} = q \cdot \sqrt{\frac{P+P_0}{P_R} \cdot \frac{T_R}{T+T_0}},$$

where, $\tilde{q}$ = compensated steam flow, $q$ = steam flow, $P$ = steam pressure in psig, $P_0$ = absolute pressure conversion, $P_R$ = absolute steam design pressure in psia, $T$ = steam temperature in °F., $T_0$ = absolute temperature conversion, and $T_R$ = absolute steam design temperature, in °R.

41. The program storage device as recited in claim 39, wherein the compensated carbon line steam flow is calculated by the following equation:

$$\tilde{q} = q \cdot \sqrt{\frac{P+P_0}{P_R} \cdot \frac{T_R}{T+T_0}},$$

where, $\tilde{q}$ = compensated steam flow, $q$ = steam flow, $P$ = steam pressure in psig, $P_0$ = absolute pressure conversion, $P_R$ = absolute steam design pressure in psia, $T$ = steam temperature in °F., $T_0$ = absolute temperature conversion, and $T_R$ = absolute steam design temperature, in °R.

42. A program storage device readable by a machine, tangibly embodying a program of instructions executable by the machine to perform method steps of controlling an air separation unit (ASU) that provides oxygen to a gasification plant, the gasification plant converting the oxygen and hydrocarbon feedstock into syngas composed primarily of hydrogen (H$_2$) and carbon monoxide (CO), the method steps comprising:

comparing oxygen valve positions of a plurality of gasifiers that are operating simultaneously at a high selector, and outputting a value x;

calculating F(x)=0.002x+0.08, where F(x)>0.99, and x is the output of the high selector; and calculating F(y)=0.002y+0.81, where F(y)>1.0, and y is the oxygen valve position of a selected gasifier.

43. The program storage device as recited in claim 42, further performing the steps of:

dividing an actual oxygen setpoint value by F(y) at a divider;

adding the output of the divider and other divider outputs from other gasifiers at a first adder;

multiplying the output of the first adder by F(x) at a first multiplier and generating a discharge controller set-point value, the discharge controller setpoint value representing the discharge of the ASU; and adding oxygen flow rates from all gasifiers at a second adder and generating a total oxygen flow rate.

44. The program storage device as recited in claim 42, further performing the steps of:

receiving the discharge controller setpoint and the total oxygen value setpoint at a PID controller, and outputting a discharge controller output signal;

velocity limiting the discharge controller output signal; and receiving the velocity limited discharge controller output signal at a low selector along with outputs from one or more compressor suction flow controllers, one or more ASU suction vent controllers and one or more compressor protection controllers, and outputting an oxygen compressor inlet valve signal.

45. A program storage device readable by a machine, tangibly embodying a program of instructions executable by the machine to perform method steps of controlling high pressure of a syngas header in a gasification plant, the syngas header transporting syngas from a gasifier, the gasification plant converting oxygen and hydrocarbon feedstock into the syngas composed primarily of hydrogen (H$_2$) and carbon monoxide (CO), the method steps comprising:

receiving a syngas header flow rate, a syngas header temperature and a syngas header pressure signal at a flow compensator, and calculating a compensated syngas header flow; and calculating a syngas header flare vent valve bias from the compensated syngas header flow, the syngas header temperature, and a maximum allowable flow through a syngas header valve.

46. A program storage device readable by a machine, tangibly embodying a program of instructions executable by the machine to perform method steps of controlling high pressure of a syngas header in a gasification plant, the syngas header transporting syngas from a gasifier, the gasification plant converting oxygen and hydrocarbon feedstock into the syngas composed primarily of hydrogen (H$_2$) and carbon monoxide (CO), the method steps comprising:

receiving a syngas header flow rate, a syngas header temperature and a syngas header pressure signal at a flow compensator, and calculating a compensated syngas header flow; and calculating a syngas header flare vent valve bias from the compensated syngas header flow, the syngas header temperature, and a maximum allowable flow through a syngas header valve;

wherein the syngas header flare vent valve bias is calculated from the following equation:

$$\Delta Z = \frac{q}{q_R} \cdot \frac{P_R}{P+P_0} \cdot \sqrt{\frac{T+T_0}{T_R}} \cdot 100,$$

where, $\Delta Z$ = High override clean syngas pressure controller output bias, in %, $q$ = Predicted compensated syngas flow, in scfh, $q_R$ = Syngas design flow, in scfh, $P_R$ = Absolute clean syngas design pressure, in psia, -continued $P$ = Clean syngas pressure, in psig, $P_0$ = Absolute pressure conversion, $T$ = Clean syngas temperature, in ° F., $T_0$ = Absolute temperature conversion, and $T_R$ = Absolute clean syngas design temperature, in ° R.

47. The program storage device as recited in claim 46, further performing the steps of:

receiving the syngas header flare vent valve bias and a combustion turbine trip signal at a bias ramp, and outputting a bias ramp signal;

adding the bias ramp signal to combustion turbine trip signals from other turbines at an adder, and outputting a total bias signal; and multiplying a syngas header pressure setpoint value by 1.02 at a multiplier, and generating a high pressure setpoint.

48. The program storage device as recited in claim 47, further performing the steps of:

receiving a syngas header pressure signal and the high pressure setpoint at a PID controller, and outputting a PID controller output signal; and biasing the PID controller output signal with the total bias signal; and generating a syngas header flare vent value position.

* * * * *